(12) United States Patent
Barry et al.

(10) Patent No.: US 8,413,086 B2
(45) Date of Patent: Apr. 2, 2013

(54) METHODS AND APPARATUS FOR ADAPTING PIPELINE STAGE LATENCY BASED ON INSTRUCTION TYPE

(75) Inventors: Edwin Franklin Barry, Vilas, NC (US); Gerald George Pechanek, Cary, NC (US); Patrick R. Marchand, Apex, NC (US)

(73) Assignee: Altera Corporation, San Jose, CA (US)

( * ) Notice: Subject to any disclaimer, the term of this patent is extended or adjusted under 35 U.S.C. 154(b) by 270 days.

(21) Appl. No.: 12/861,896

(22) Filed: Aug. 24, 2010

(65) Prior Publication Data

US 2010/0318775 A1   Dec. 16, 2010

Related U.S. Application Data

(62) Division of application No. 10/805,803, filed on Mar. 22, 2004, now Pat. No. 7,809,932.

(51) Int. Cl.
*G06F 17/50* (2006.01)

(52) U.S. Cl. .................................... 716/104; 716/114

(58) Field of Classification Search .................. 716/102, 716/103, 104, 114; 712/220, 229, 234
See application file for complete search history.

(56) References Cited

U.S. PATENT DOCUMENTS 5,870,309 A * 2/1999 Lawman ..................... 716/102

* cited by examiner

*Primary Examiner* — Vuthe Siek
(74) *Attorney, Agent, or Firm* — Law Offices of Peter H. Priest, PLLC

(57) ABSTRACT

Processor pipeline controlling techniques are described which take advantage of the variation in critical path lengths of different instructions to achieve increased performance. By examining a processor's instruction set and execution unit implementation's critical timing paths, instructions are classified into speed classes. Based on these speed classes, one pipeline is presented where hold signals are used to dynamically control the pipeline based on the instruction class in execution. An alternative pipeline supporting multiple classes of instructions is presented where the pipeline clocking is dynamically changed as a result of decoded instruction class signals. A single pass synthesis methodology for multi-class execution stage logic is also described. For dynamic class variable pipeline processors, the mix of instructions can have a great effect on processor performance and power utilization since both can vary by the program mix of instruction classes. Application code can be given new degrees of optimization freedom where instruction class and the mix of instructions can be chosen based on performance and power requirements.

20 Claims, 16 Drawing Sheets

FIG. 5

| MCLK CYCLE # | FETCH | DECODE | EXECUTE |
|---|---|---|---|
| 1 | A(1) 542 | : | : |
| 2 | B(1) 545 | A(1) 546 | : |
| 3 | C(1) 548 | B(1) 549 | A(1) |
| 4 | D(2) 552 | C(1) 553 | B(1) |
| 5 | E(1) 556 | D(2) 557 | C(1) |
| 6 | HOLD PCntr, HOLD IR 560 | HOLD DR 561 | D(2) |
| 7 | F(1) 564 | E(1) 565 | D(2) |
| 8 | G(2) | F(1) | E(1) |
| 9 | H(2) | G(2) | F(1) |
| 10 | HOLD PCntr, HOLD IR | HOLD DR | G(2) |
| 11 | I(2) | H(2) | G(2) |
| 12 | HOLD PCntr, HOLD IR | HOLD DR | H(2) |
| 13 | J(1) | I(2) | H(2) |
| 14 | HOLD PCntr, HOLD IR | HOLD DR | I(2) |
| 15 | K(1) | J(1) | I(2) |
| 16 | L(1) | K(1) | J(1) |
| 17 | : | L(1) | K(1) |
| 18 | : | : | L(1) |
| 19 | : | : | : |

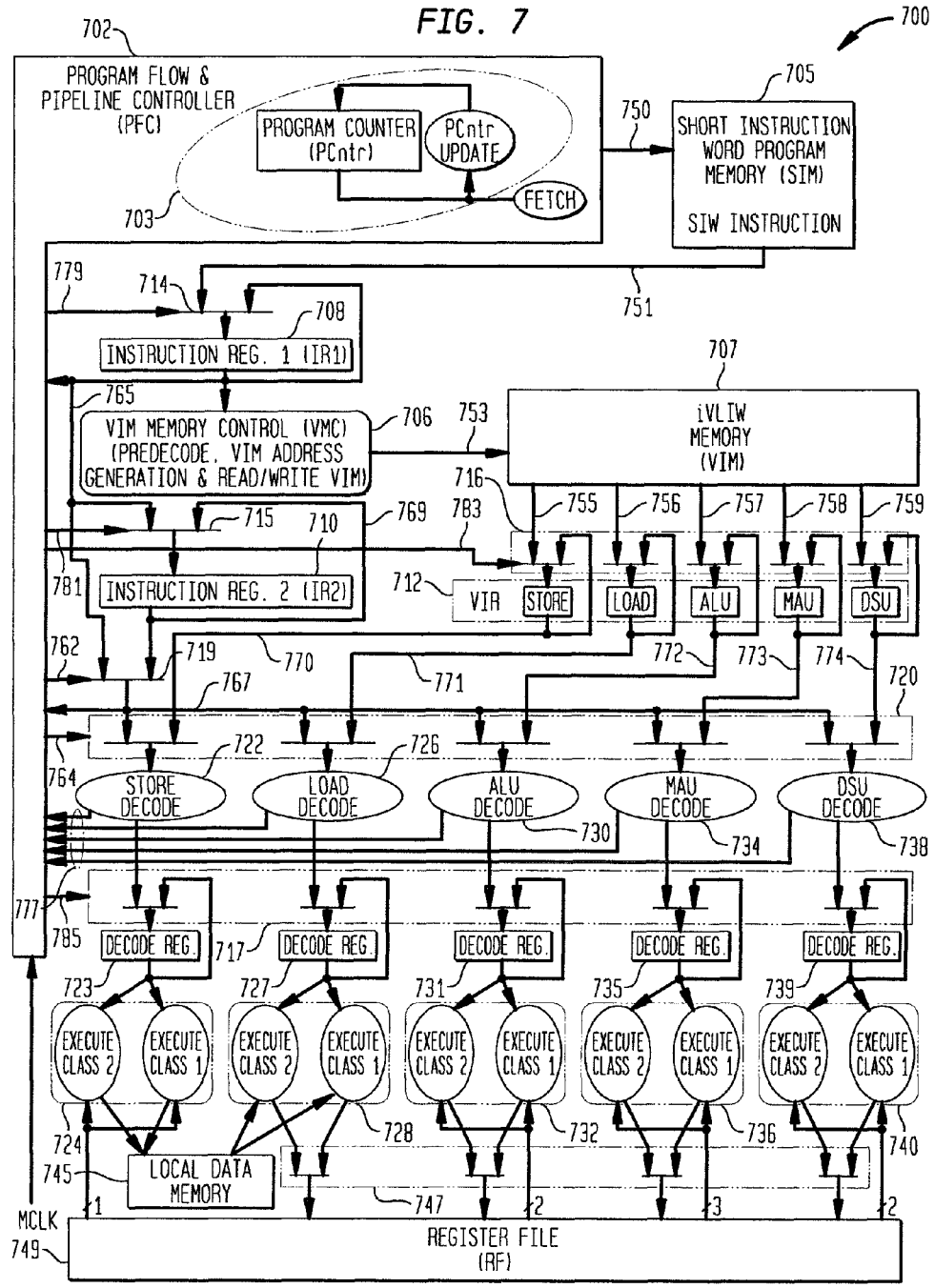

EXAMPLE BASIC ARITHMETIC INSTRUCTION FORMAT (ALU, MAU AND DSU)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | 6-BIT OPCODE | | | | | | | 5-BIT RT | | | | | | 5-BIT RX | | | | | | 5-BIT RY | | | | | 0 | CE2 | | 3-BIT DTYPE | | |
| | | | CLASS | | 4-BIT InstOp | | | | | | | | | | | | | | | | | | | | | | | | | | |

902 — { 0 0 = CLASS 1, PCLK = 3 MCLKs — 906
0 1 = CLASS 2, PCLK = 4 MCLKs — 908
1 0 = CLASS 3, PCLK = 6 MCLKs — 910
1 1 = RESERVED — 912

| MCLK CYCLE # | PCLK CYCLE # | FETCH | DECODE | EXECUTE |
|---|---|---|---|---|
| 1 | | | | |
| 2 | 1 | A(1) | : | : |
| 3 | | 933 | 932 | |
| 4 | | | | |
| 5 | 2 | B(2) | A(1) | : |
| 6 | | 937 | 938 | 939 |
| 7 | | | | |
| 8 | 3 | C(3) | B(2) | A(1) |
| 9 | | 943 | 944 | 945 | 946 |
| 10 | | | | |
| 11 | | | | |
| 12 | 4 | D(1) | C(3) | B(2) |
| 13 | | 950 | 951 | 952 | 953 |
| 14 | | | | |
| 15 | | | | |
| 16 | | | | |
| 17 | 5 | E(1) | D(1) | C(3) |
| 18 | | | | |
| 19 | | 958 | 959 | 960 | 961 |
| 20 | | | | |
| 21 | 6 | F(1) | E(1) | D(1) |
| 22 | | 968 | 969 | 970 | 971 |
| 23 | | | | |
| 24 | 7 | : | : | : |
| 25 | | | | |

METHODS AND APPARATUS FOR ADAPTING PIPELINE STAGE LATENCY BASED ON INSTRUCTION TYPE

FIELD OF THE INVENTION

The present invention relates generally to techniques to improve processor performance through improvements in the processor pipeline. More particularly, the present invention provides advantageous techniques which in a typical application may provide higher instruction throughput for a given pipeline depth with minimal affects on hardware costs, with minimal, if any, change to the programming model when applied to an existing pipeline, and without an increase in the number of pipeline stages.

BACKGROUND OF THE INVENTION

Application programs can generally be divided into two broad categories: a first category having sequential code segments with low levels of instruction level parallelism (ILP), such as control code, and a second category having code segments with high levels of ILP, which is referred to herein as parallel code. Both of these code types are often intermixed in an application program and both need to be efficiently processed to achieve high performance for the whole program.

Sequential code may be defined as an ordered sequence of instructions that when executed on a processor completes the instructions in the order specified. Given an existing processor with a fixed instruction set and operating at a maximum clock frequency, one of the primary means available for executing instructions faster is to increase the clock frequency in a new processor implementation. This increased clock frequency requires a larger number of processing stages so that each stage has a smaller latency, in effect increasing temporal parallelism through deeper pipelining. Since sequential code often has a relatively high number of branch instructions, increasing the pipeline depth can lead to longer branch latencies. To address such long latencies, prior techniques have included the use of conditional or predicated execution to minimize the use of branches, or complex branch prediction strategies, or some combination of such approaches, which for all of these techniques there is increased hardware complexity. Adding stages to an existing pipeline potentially has the additional, and possibly most serious problem of changing the programming model. Adding pipeline stages in a new processor implementation while avoiding programming model changes can result in much higher hardware complexity and power consumption, reduced performance gain, or both.

A processor architecture can be considered to consist of a variety of executable function instructions, such as addition, subtraction, multiplication, division, compares, ANDs, ORs, ExclusiveORs, NOTs, shifts, rotates, permutes, bit operations, moves, loads, stores, communications and variations and combinations of the like. The execution of these diverse instructions also will have a wide diversity of execution delays. In developing a processor pipeline, the execution delays for each instruction, as it flows through the pipeline, are examined and typically the longest delay path through any stage sets the pipeline clock period and consequent operating frequency. The longest delay path is a worst case path and is typically referred to as a critical timing path. A pipeline stage logic path typically begins with output signals from a previous stage's storage device, such as a latch, register, or memory. The signals then flow through function specific combinatorial logic defining the functional portion of the pipeline stage. Then the pipeline stage ends with saving that stage's output in a storage device. Increasing the clock frequency reduces the clock period and typically causes the addition of pipeline stages since there is less time to accomplish the longest path function specific combinatorial logic.

Given such observations, a need exists for the development of a processor pipeline that takes advantage of the variation in critical path lengths of different processor instructions, and the tendency for different processor instructions to be used together in different contexts in order to achieve increased instruction throughput. Further, a need exists that any advantageous changes to the pipeline minimally, if at all, affect the programming model, implementation silicon area and power for such an implementation.

SUMMARY OF THE INVENTION

To address these needs, the present invention takes advantage of the differences between simple and complex instructions' critical path delays and the tendency for decision-intensive sequential code to consist largely of simpler instructions. Further, when considering a mix of simple and complex instructions in an application program, the program throughput will improve if the simple instructions' execution latency is improved by use of the techniques of the present invention compared to the execution latency of more complex instructions.

Among its several aspects, the present invention addresses a method for partitioning a processor's operations into "speed classes" based on their critical paths in each pipeline stage. A processor with an instruction class controllable fetch, decode, and execute pipeline is described. With an instruction set architecture split into a class one set of instructions that require a short execution latency and a class two set of instructions that require a longer execution latency, a program consists of a diverse mix of class one and class two instructions that are stored in the processor's program memory. The class controllable pipeline processor fetches instructions from the program memory and stores each fetched instruction in an instruction register during the fetch stage of the pipeline. The instruction stored in the instruction register is classified as a class one or a class two instruction and further decoded in preparation for execution with the decoded instruction stored in a decode register during the decode pipeline stage. The instruction classification causes an adaptable pipeline control unit to adapt the pipeline to the instruction class in execution. The instruction stored in the decode register is then executed in a short execution latency if it is a class one instruction or executed in a longer execution latency if it is a class two instruction, in the adaptable execute pipeline stage.

In another aspect, the invention addresses methods and apparatus for achieving higher average instruction throughput in a processor pipeline by varying the effective pipeline clock frequency based on the instruction type. In particular, for high-performance parallel processor architectures, this approach can provide a significant level of sequential code performance improvement.

More specifically, such an approach may provide for higher instruction throughput for a given pipeline depth at minimal or no change to the programming model when applied to an existing pipeline and at no increase in the number of pipeline stages and consequently minimal additional hardware cost and minimal affect on power consumption due to any additional hardware.

The instruction adaptable pipeline processor also supports optimization techniques to improve the performance and power characteristics of the adaptable pipeline processor when executing a program containing a mix of instruction classes.

A more complete understanding of the present invention, as well as other features and advantages of the invention, will be apparent from the following detailed description and the accompanying drawings.

BRIEF DESCRIPTION OF THE DRAWINGS

FIG. 5 illustrates an instruction execution sequence in a three-stage pipeline for a processor supporting two classes of instructions;

FIG. 7 illustrates an indirect VLIW processor with five pipeline stages supporting two instruction classes in each VLIW instruction slot;

FIG. 9A illustrates an exemplary basic arithmetic instruction format (ALU, MAU, and DSU) with an encoded instruction class bit field;

FIG. 9B illustrates an exemplary variable pipeline instruction execution sequence in a three-stage pipeline for a processor supporting three classes of instructions and using a variable clock pipeline controlling mechanism;

DETAILED DESCRIPTION

Figure 1:
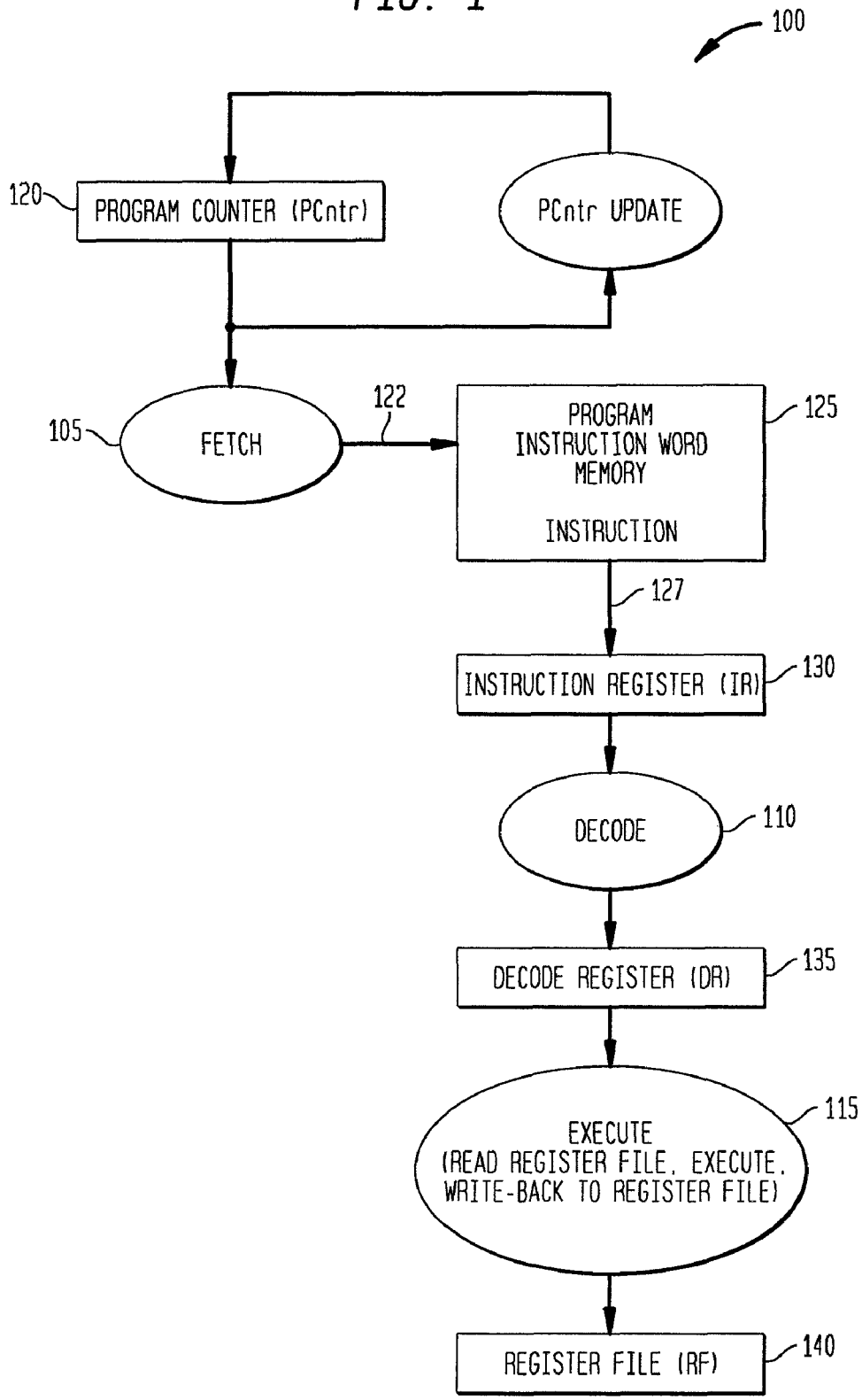
FIG. 1 illustrates an exemplary three-stage instruction pipeline.

Various general observations concerning processors and application programs may be made as follows:
(1) Instructions in a programmable processor may vary in logical complexity and their implementations within the same processor may vary from one another in relative performance when synthesized for a given process technology and target clock frequency. Instruction timing performance is measured by each instruction's critical path, a measure of the worst-case signal propagation time for the instruction in each pipeline stage.
(2) For a processor with instructions of varying complexity, the instructions can be classified into "speed classes", that is, separated into groups of instructions whose critical paths lie in the same range.
(3) High performance parallel processors which use superscalar and/or VLIW techniques, particularly those used for digital signal processing, often support complex instruction types for specialized functions including packed data operations, complex multiplication, floating point operations and other special functions. In current designs, these more complex instructions typically have longer critical paths and therefore require either a lower frequency clock when implemented in an existing pipeline architecture, or a greater number of pipeline stages when developed for a higher frequency clock.
(4) Increasing the number of pipeline stages in an existing instruction pipeline using conventional techniques provides the possibility for higher clock-rates, and therefore throughput, but introduces a number of problems:
   a. Additional stages result in higher average branch latencies unless complex branch prediction or multi-threading schemes are employed.
   b. Adding stages also adds registers and other hardware modifications due to additional pipeline complexity. These additions also tend to increase power consumption.
   c. The programming model may be altered as compared to the original pipeline unless significant steps are taken, such as register bypassing, forwarding, or use of delays, for example, to avoid it.
(5) Simpler instructions tend to have shorter critical paths.
(6) The primary types of instructions that are typically used in sequential or "control-oriented" program code are relatively simple. For example, these instructions include types of loads/stores, compare operations, branches, bit operations, simpler arithmetic operations such as add, subtract, shifts, and rotates on relatively small data types, such as 32-bits or less. These operations, if implemented by themselves without the constraints of other higher complexity instructions, could result in a higher frequency design for a given area constraint.
(7) In a processor supporting parallel operations, the program's context often alternates between sequential code and parallel code which is often executed within loops, and it should be possible to take advantage of the relative speed potential of a "fast" instruction class through specialized pipeline control.
(8) "Parallel" code may also be accelerated, particularly in multi-processor element (PE) systems, when an instruction which is a member of a "fast" class of instructions is distributed to all PEs at once and executed in parallel, single instruction multiple data (SIMD) fashion.
(9) There may be more than two speed/context classes of instructions, with appropriate pipeline control for each to achieve maximum instruction throughput.
(10) The pipeline control methodology which results from these observations is more generally applicable to any type of processing unit, whether fixed-function or programmable, which has the following properties:
   a. A variety of operations are executed in a multistage pipeline.
   b. Operations may be divided into "speed classes", where operations in a class lie within a given critical path range.

c. Operations from each class formed in (b) also form temporal contexts in which members of "faster" classes tend to be executed together without significant intermixing with operations from "slower" classes.

d. Instructions specifying operations are able to be fetched, issued, decoded and classified at a rate that matches that of the fastest execution instruction class.

In order to teach the concepts in the invention, an exemplary three-stage pipeline is described and then transformed according to the methods of this invention to achieve higher performance. For this example, the instructions are first classified by their critical paths in order to create speed classes, then it is shown how the critical paths can be separated and the pipeline controlled to vary pipeline cycle time on an instruction by instruction basis.

A three-stage basic pipeline 100 is shown in FIG. 1. Pipeline 100 includes fetch 105, decode 110 and execute 115 stages with each stage completing its operation in the same time period. A program counter (PCntr) 120 logically supplies an address 122 to a program instruction memory 125 which returns an instruction 127 during the fetch stage 105. The returned instruction is stored in an instruction register (IR) 130. During the next cycle, the instruction passes through the decode stage 110 and register addresses and control signals are latched in decode register (DR) 135 at the end of the cycle. During the next cycle, register addresses from the DR 135 are used to access register file 140, the decoded instruction is processed in the execute stage 115 and results are written back to the register file 140. The processor using the pipeline 100 is specified as a load/store architecture in which data memory (not shown) is accessed during the execute stage 115.

In pipeline 100, an instruction I may be executed each cycle, while the next instruction I+1 is being decoded, and instruction I+2 is being fetched. All pipeline stages typically advance with the same timing. The maximum clock frequency is limited by the longest latency logic path, the critical path, which corresponds to a particular instruction being processed at some stage. Often, this path will occur during the execute stage. However, the longest path can be in another stage, such as the decode stage, for example, if an address calculation for a load or store instruction is done there. In order to describe the basic inventive concepts, it is not unreasonable to assume that the longest latency path is in the execute stage for a processor with complex instructions and further that the fetch and decode stages are significantly faster. In other words, that the fetch and decode stages have a significantly shorter critical path. The discussion which follows makes this assumption.

For purposes of discussion, consider two instructions to be executed where all registers are 32-bit registers. One is a simple 32-bit compare (CMP) implemented with a subtract which sets flags and does not update a target register and the other is a 32-bit multiply (MPY) that executes a 32-bit×32-bit multiplication:

| CMP R1, R2; | R1 compare R2 and set flags as appropriate |
| MPY R6‖R7,R3,R4; | R6‖R7 = R3 * R4 |

The compare instruction takes two 32-bit registers as operands, compares them and sets flags. The MPY operation takes two 32-bit register source operands and produces a 64-bit output. The target operand R6‖R7 in the above MPY syntax refers to the register pair R6 and R7 while R3 and R4 are treated as registers containing 32-bit word values. R3 is multiplied by R4, and the result is then stored in register pair R6‖R7.

It is easy to see that the MPY instruction requires significantly more data path gates than the CMP compare instruction. From a timing perspective, in a typical processor design, the MPY instruction will therefore limit the maximum pipeline clock frequency.

Next consider that the CMP instruction is representative of a class of instructions, class 1, that have relatively simple data paths and short execution path timing, while the MPY is representative of a second class of instructions, class 2, which have relatively complex data paths and therefore longer execution path timing. The pipeline stages preceding the execution stage, such as a fetch stage and a decode stage, typically are of the same order of complexity as a class 1 execution function and can operate at the class 1 execution rate. If class 1 instructions form a set of instructions which are used together frequently, the present invention recognizes that it is possible to create more efficient and higher performance programs by using a new pipeline organization and modified pipeline control that more optimally supports the two classes of instructions. In order to group the instructions by classes, the instructions are first ordered by their critical paths in ascending order. Then, depending upon implementation constraints and performance and algorithm requirements, the classes of instructions are selected.

Figure 2:
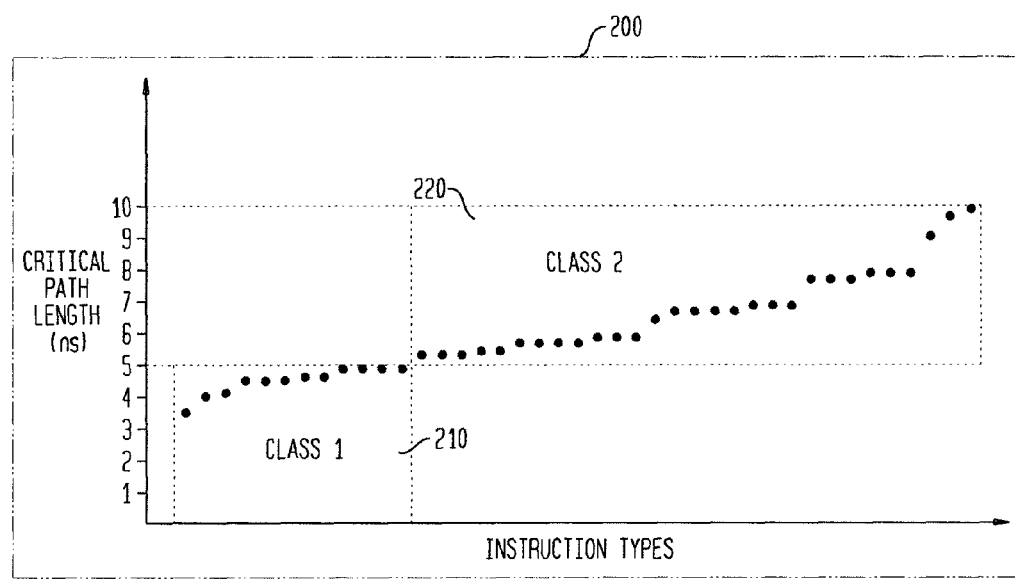
FIG. 2 illustrates a graph of critical path versus instruction type.

FIG. 2 shows a graph 200 for a set of instructions arranged in monotonically increasing order of worst case critical path length of each instruction's execution logic, where the critical paths are measured in nanoseconds (ns). Class 1 is a set 210 of instructions which have critical paths below 5 ns, while class 2 is a set 220 of instructions which have critical paths above 5 ns but below 10 ns. Note that there is actually a graph, such as graph 200, for each pipeline stage.

Figure 3:
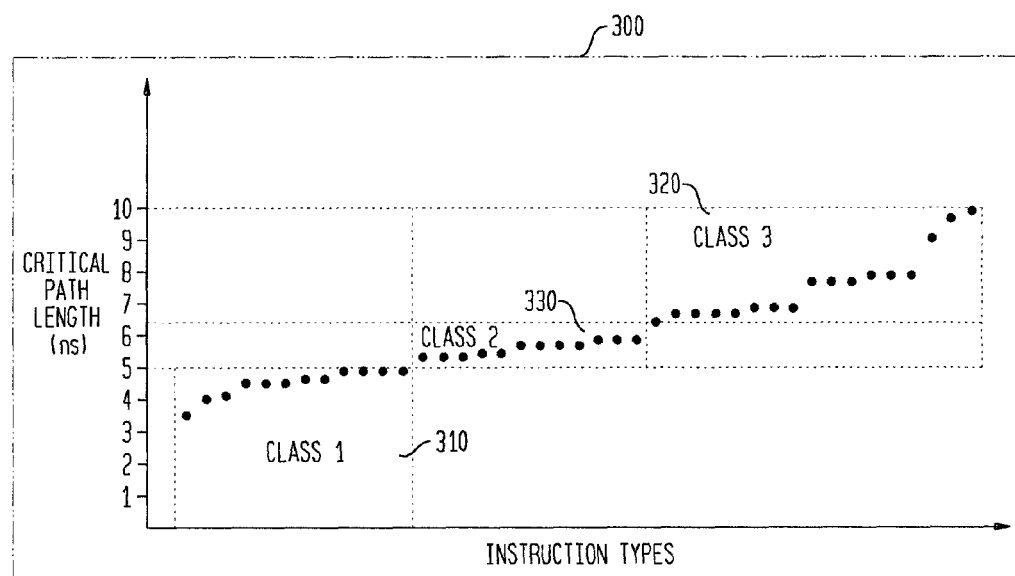
FIG. 3 illustrates a graph of three critical path classes versus instruction type.

Although the present example addresses only two classes of instructions as exemplary, it will be recognized that the invention is not limited to only two classes and may be extended to any number, though increasing the number of classes also increases the hardware design and synthesis complexity. For example, FIG. 3 illustrates a graph 300 for a set of instructions which is divided into three classes: class 1 instructions 310 with an execution logic latency less than or equal to 5 ns and a clock frequency of 200 MHz, class 2 instructions 330 with an execution logic latency greater than 5 ns but less than or equal to 6.67 ns and a clock frequency of 150 MHz, and class 3 instructions 320 with an execution logic latency greater than 6.67 ns but less than or equal to 10 ns and a clock frequency of 100 MHz.

Figure 4:
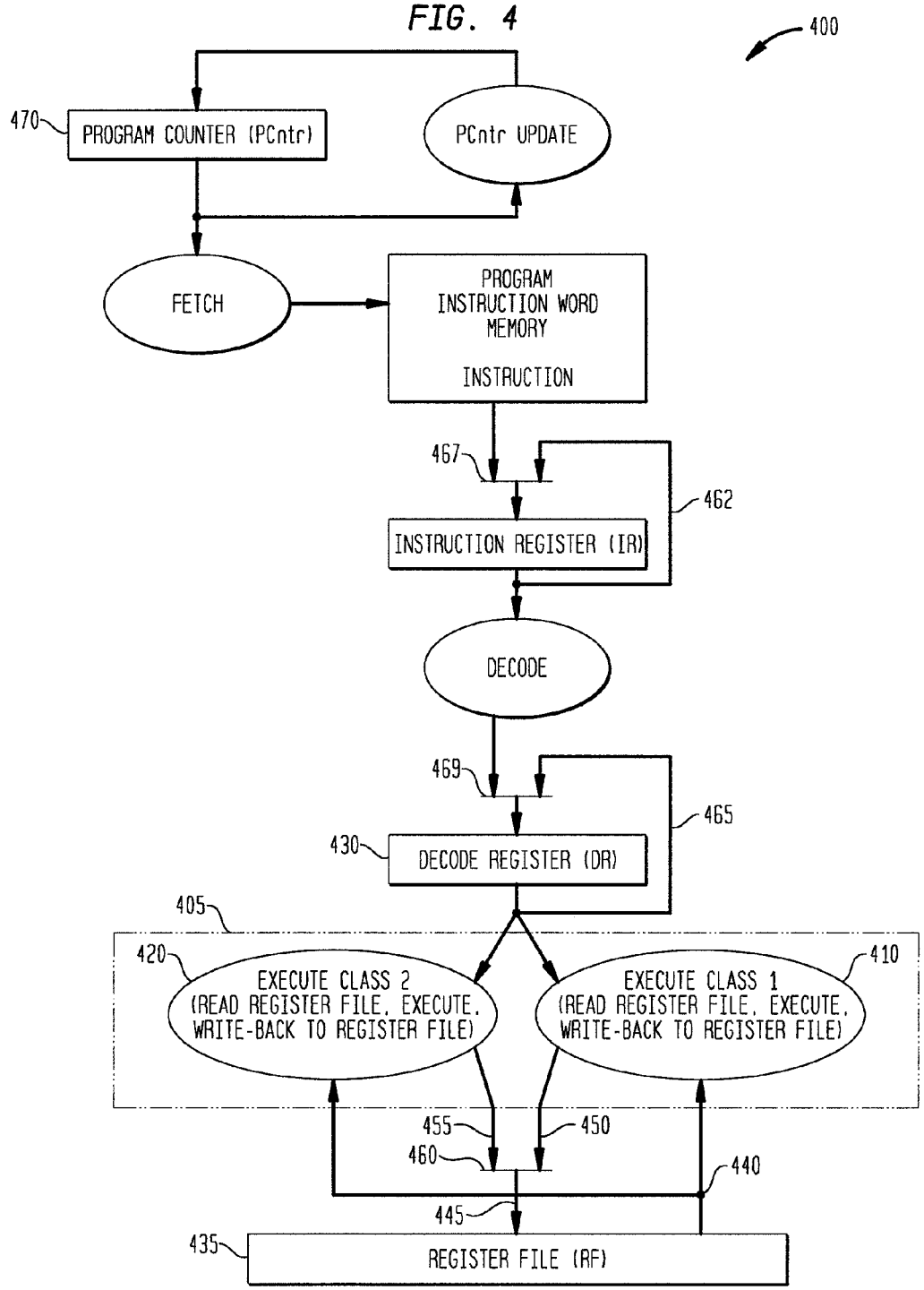
FIG. 4 illustrates a modification to the three-stage instruction pipeline of FIG. 1 to support two instruction classes.

FIG. 4 illustrates a three-stage pipeline 400 supporting two classes of instructions. The pipeline 400 is similar to pipeline 100 of FIG. 1 except that the execute stage 405 is made up of two parallel execution blocks of logic 410 and 420 and the pipeline is controlled to effectively utilize block 410 and 420 as discussed further below. Execute logic block 410 contains the execution path combinatorial logic for class 1 instructions and execute logic block 420 contains the execution path combinatorial logic for class 2 instructions. Execute logic blocks 410 and 420 receive decoded instructions 465 from decode register 430. The register file 435 shares its output ports 440 and input ports 445 between the two execute logic blocks 410 and 420. Output 450 from the class 1 execute logic block 410 and output 455 from the class 2 execute logic block 420 are multiplexed together by multiplexer 460, with the appropriate execution class logic block output selected based on the decoded class instruction type in execution. The multiplexer 460 output 445 connects to a register file input port and at the completion of an execution stage operation the appropriate execute logic block output is written to the register file 435. Only one instruction, a class 1 or a class 2 instruction, is in the execute phase at any time.

For the pipeline 400 of FIG. 4, and according to the graph 200 of FIG. 2, class 1 instructions can execute at a master clock frequency (MCLK) of 200 MHz, but class 2 instructions can only reach a maximum frequency of ($\frac{1}{2}$) MCLK=100 MHz due to the slower class 2 execute logic block 420. It is noted that class 2 instructions are to be processed at 200 MHz in the fetch and decode stages. As long as class 1 instructions are fetched and executed, a new instruction is moved through each stage of the pipeline every MCLK cycle.

If a class 2 instruction is detected during the decode stage, then on the next cycle, the class 2 execute stage is extended by an additional MCLK cycle by holding all other pipeline stages constant using the feedback paths 462 and 465 to multiplexers 467 and 469 respectively, and holding the PCntr 470 constant. After the two MCLK cycles, the pipeline advances again. If subsequent instructions are class 1 instructions, then the pipeline resumes processing an instruction every MCLK cycle. If the subsequent instructions are class 2 instructions, then instructions in the pipeline advance one stage every two MCLK cycles. Note that for class 2 instructions, the execute stage is simply allocated more master clock cycles, one additional cycle in this case, and no additional pipeline stages are used for execution, which means improved performance is obtained with minimum impact to power and logic area. In this fashion, the pipeline controller advances the pipeline according to the types of instructions being processed. The effective throughput of an application is now governed by the relative numbers of class 1 and class 2 instructions processed.

FIG. 5 shows an example of an instruction execution sequence 500, where class 1 instructions are represented by X(1)'s, and class 2 instructions are represented by X(2)'s, where the letter X is replaced by a different letter for each specific instruction of the class in parenthesis. Absolute time advances moving down the table with the leftmost column 505 representing cycles at the MCLK rate and the processing stages fetch 510, decode 515 and execute 520 are shown as columns left-to-right. The instruction sequence [1], by class, beginning with instruction A(1) is:

A(1), B(1), C(1), D(2), E(1), F(1), G(2), H(2), I(2), J(1), K(1), L(1),  [1]

and this can be seen in the second column 510 labeled "Fetch".

If all of the instructions in this exemplary sequence were to be executed in a pipeline 100 such as shown in FIG. 1, then the longest latency instruction of the processor's architecture would set the MCLK period and all instruction would execute as a single class. Since the longest latency instructions in the given sequence [1] are class 2 instructions, then all instructions would execute at the class 2 rate which for instruction types such as depicted in graph 200 of FIG. 2, the class 2 instructions have twice the latency of class 1 instructions. Consequently, the exemplary sequence of instructions would require 14 cycles, at a clock frequency of ($\frac{1}{2}$)MCLK, or 28 MCLK cycles.

In the pipeline 400, as shown in FIG. 4, the instructions more optimally execute at their specified class rate and require 18 cycles at a clock frequency of MCLK, twice as fast as compared to executing the instruction sequence on the pipeline 100 of FIG. 1. The speedup of the new pipeline 400 of FIG. 4 relative to the old pipeline 100 of FIG. 1 is (14*2)/18=1.55, for this particular instruction sequence [1].

The exemplary pipelines 100 of FIG. 1 and 400 of FIG. 4 and the instruction critical timing path analysis illustrated in graphs 200 and 300 of FIG. 2 and FIG. 3, respectively, illustrate the basic architectural approach used to classify and control the execution rate of sets of instructions. Next, the discussion addresses a pipeline control circuit and pipeline whose operation is illustrated in FIG. 5 utilizing the instruction sequence [1], in accordance with the present invention.

Figure 6:
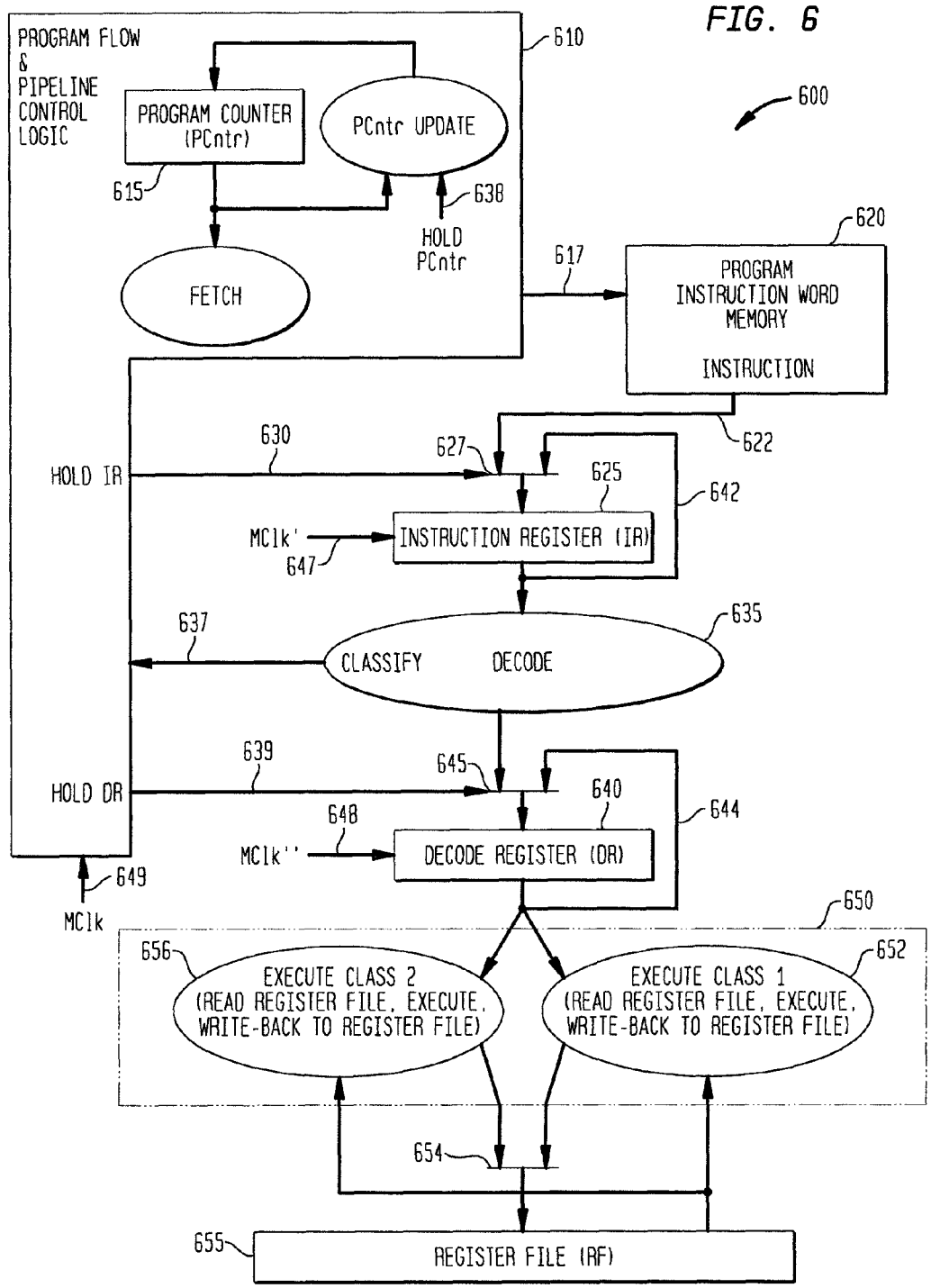
FIG. 6 illustrates a presently preferred embodiment of a pipeline and pipeline control circuit for supporting two classes of instructions in a three-stage pipeline using a pipeline holding mechanism.

A presently preferred embodiment of a pipeline and pipeline control circuit 600 supporting two classes of instructions is illustrated in FIG. 6. Its operation is preferably based on the following rules:

1) A master clock (MCLK) is used to provide a single, highest frequency clock source for pipeline control and each instruction at each stage requires an integral multiple of MCLK cycles. Note that it is not necessary that the fastest instructions execute at the MCLK frequency as is described in further detail below.

2) There is no time latency differentiation between the fetching of a class 1 instruction or a class 2 instruction. There is also no time latency differentiation between the decoding of a class 1 instruction or a class 2 instruction. Further, the fetch and decode stages are treated equally and of the same logic path duration to support the proper pipelining of instructions.

3) The slowest instruction, according to class, at any pipeline stage in the processor governs the number of MCLK cycles required before advancing the pipeline to the next stage for all instructions by holding the pipeline for the class specified number of cycles. This holding of the pipeline allows an instruction in a pipeline stage to complete the specified operation. Consequently, the instructions retain their order of execution as if the pipeline were clocked at a single but slower frequency.

4) The rate at which instructions can begin the earliest decode phase, usually this corresponds to the instruction fetch rate, dictates the highest rate that instructions can be processed since this rate is the rate at which instructions can enter the pipeline.

5) An alternative to be considered as appropriate relaxes rule (3) concerning holding all pipeline stages. For example, in some processors, such as those which contain multiple pipelines which operate in parallel, it may be advantageous to allow faster instructions, particularly those that are independent of other instructions in the pipeline, to proceed through their pipeline stages rather than be held back by a slower instruction in another pipeline. If a fast and a slow instruction in sequence together are independent of each other, then it is possible to architecturally define a pipeline where an independent fast instruction can enter execution with an independent slow instruction.

Since a slower instruction can hold back a faster instruction, pipelines with a larger number of stages increase the probability that a slower instruction will be active in the pipeline along with faster instructions. Consequently, it can be seen that this invention tends to favor, and even enhance the benefits of, shorter pipelines which would have a fewer number of different classes of instructions being processed in the pipeline during any one cycle.

The presently preferred pipeline and pipeline control circuit 600 of FIG. 6 also uses a pipeline holding mechanism similar to that applied to pipeline 400 of FIG. 4. In FIG. 6 the program flow and pipeline control logic 610 fetches instructions using a program counter (PCntr) 615 for generating an address to a program instruction word memory 620. Note that additional control signals, such as read and write enables, are not shown as they may vary depending on the process technology and implementation. An instruction 622 from the specified address is received and stored in an instruction register (IR) 625 as selected through a multiplexer 627 via an inactive hold-IR signal 630. In the next pipeline stage, decode stage 635, the program flow and pipeline control logic 610 receives an instruction classification indication 637 from a classify function of the decode logic 635 and produces hold signals, an internal hold PCntr 638, hold IR 630 and hold DR 639, which are used to selectively retain the contents of each register in the pipeline according to the instruction class.

The register contents, for example, the contents of registers 625 and 640, are retained by selecting feedback paths, for example, paths 642 and 644, through multiplexers 627 and 645, respectively, allowing MCLK' 647 and MCLK" 648 to reload the existing contents of registers 625 and 640 back into registers 625 and 640. A master clock (MCLK) 649 is used to provide the clock for the program flow and pipeline control logic 610. MCLK' 647 and MCLK" 648 provide functionally similar timing to MCLK 649 but variations may exist due to wiring delays, clock buffers, and the like depending on an implementation. As shown in FIG. 5, the hold PCntr, hold IR and hold DR signals 525-540 are timed to produce a one-cycle hold of the pipeline. The execute stage 650 is made up of execute class 1 logic block 652 and execute class 2 logic block 656. Only one instruction, a class 1 or a class 2 instruction, is in the execute stage at any time. Multiplexer 654 selects the appropriate execution logic block output as input to the register file 655.

The exemplary instruction execution sequence 500 shown in FIG. 5 is now discussed in further detail in connection with the pipeline and pipeline control logic of FIG. 6. Instructions enter the pipeline during the fetch stage, as can be seen with the first instruction A(1) 542 of the sequence being loaded into IR 625 by the end of the MCLK cycle 1 543. During the next MCLK, MCLK cycle 2 544, instruction B(1) 545 is being fetched and instruction A(1) 546 is being decoded and classified as a class 1 instruction. Since instruction A(1) is a class 1 instruction no hold signals are generated. At the end of the second MCLK cycle 544, instruction B(1) is loaded into the IR 625 replacing instruction A(1) and the decoded and classified instruction A(1) is loaded into the decode register (DR) 640. During the next MCLK, MCLK cycle 3 547, instruction C(1) 548 is being fetched, instruction B(1) 549 is being decoded and classified as a class 1 instruction and instruction A(1) 550 is in execute class 1 logic block 652. Since instruction B(1) is a class 1 instruction no hold signals are generated. By the end of the third MCLK cycle 547, instruction C(1) is loaded into the IR 625 replacing instruction B(1), the decoded and classified instruction B(1) is loaded into the DR 640, and instruction A(1) completes its execution in execute class 1 logic block 652 writing results through multiplexer 654 whose class 1 path is selected based on the decoded class 1 instruction A(1).

During the next MCLK, MCLK cycle 4 551, a class 2 instruction D(2) 552 is being fetched and the pipeline advances such that by the end of the fourth MCLK cycle 551, the class 2 instruction D(2) is loaded into the IR 625 replacing instruction C(1), the decoded and classified instruction C(1) 553 is loaded into the DR 640, and instruction B(1) 554 completes its execution in execute class 1 logic block 652. It is during the next MCLK cycle that we see the use of the hold signals. During the fifth MCLK cycle 555, instruction E(1) is being fetched, instruction D(2) 557 is being decoded and classified as a class 2 instruction and instruction C(1) 558 is in execute class 1 logic block 652. Since instruction D(2) is a class 2 instruction, hold signals are generated. It is assumed that the instruction E(1) being fetched will be allowed to complete loading E(1) into IR 625 at the end of the fifth MCLK cycle 555. Also, at the end of the fifth MCLK cycle 555, the decoded and classified instruction D(2) is loaded into the DR 640 and instruction C(1) completes its execution in execute class 1 logic block 652. It is during the sixth MCLK cycle 559 that the pipeline is in a hold condition. The PCtr 615 may be updated to point to instruction F(1) in the program instruction word memory 620, but the fetch operation is on hold and no fetch occurs. The previously fetched instruction E(1) is maintained in the IR 625 by hold IR signals 560, 630, the decoded and classified instruction D(2) is maintained in the DR 640 by hold DR signal 561, 639, and the instruction D(2) 562 is in its first period of execution in execute class 2 logic block 656.

The hold signals are then released allowing the pipeline to continue with the seventh MCLK period 563. The instruction F(1) 564 is now fetched, the instruction E(1) 565 is decoded and classified as a class 1 instruction and instruction D(2) 566 is in its second period of execution in execute class 2 logic block 656. The pipeline has returned to normal operation so that by the end of the seventh MCLK cycle 563, the instruction F(1) is loaded into the IR 625 replacing the previously held instruction E(1), the decoded and classified instruction E(1) is loaded into DR 640, and the class 2 instruction D(2) completes its execution having had two MCLK periods to do so. Instruction D(2) completes its execution in execute class 2 logic block 656 and results are written through multiplexer 654 whose class 2 path is selected based on the decoded class 2 instruction D(2). The pipeline control and operation continues in a similar fashion for each class 2 instruction it receives, decodes and classifies and executes as shown in FIG. 5 for class 2 instructions G(2), H(2) and 1(2) causing pipeline holds 530, 535 and 540 respectively.

FIG. 7 illustrates an embodiment of a reconfigurable pipeline indirect VLIW processor 700 supporting two instruction classes. The indirect very long instruction word (iVLIW) processor 700, in accordance with the present invention, includes a program flow and pipeline controller (PFC) 702, containing program counter logic (PCntr) 703 for reading short instruction words (SIW) from a short instruction word program memory (SIM) 705, a VLIW memory controller (VMC) 706 for reading instructions from VLIW memory (VIM) 707, an instruction register 1 (IR1) 708, an instruction register 2 (IR2) 710, VLIW instruction register (VIR) 712, register state maintaining multiplexers 714, 715, 716 and 717, short instruction word pipe multiplexer 719, and short instruction word bypass path multiplexers 720. The iVLIW processor 700 further includes a store decode unit 722, store decode register 723, store two-class execute unit 724, load decode unit 726, load decode register 727, load two-class execute unit 728, ALU decode unit 730, ALU decode register 731, ALU two-class execute unit 732, MAU decode unit 734, MAU decode register 735, MAU two-class execute unit 736, DSU decode unit 738, DSU decode register 739, DSU two-class execute unit 740, local data memory 745, execute units two-class sharing multiplexers 747, and register file (RF) 749.

Instruction processing begins with the program flow and pipeline control unit 702 generating a program short instruction word memory address and control signals 750 to read an instruction from SIM 705. The IR1 708 receives the fetched SIW 751 through multiplexer 714. The instruction in IR1 is predecoded by the VMC 706 as an early simple decode test for indirect VLIW instructions which require a VIM 707 access. If a VIM fetch instruction is predecoded, the VMC 706 generates the appropriate address and control signals 753 to fetch a VLIW, consisting of up to five SIWs 755-759 in this embodiment, from VIM 707 and stores the fetched VLIW in the VIR 712. The PFC 702 also decodes and classifies the instructions in IR1 708 to determine the pipeline's next state as discussed in conjunction with FIG. 8A.

Figure 8A:
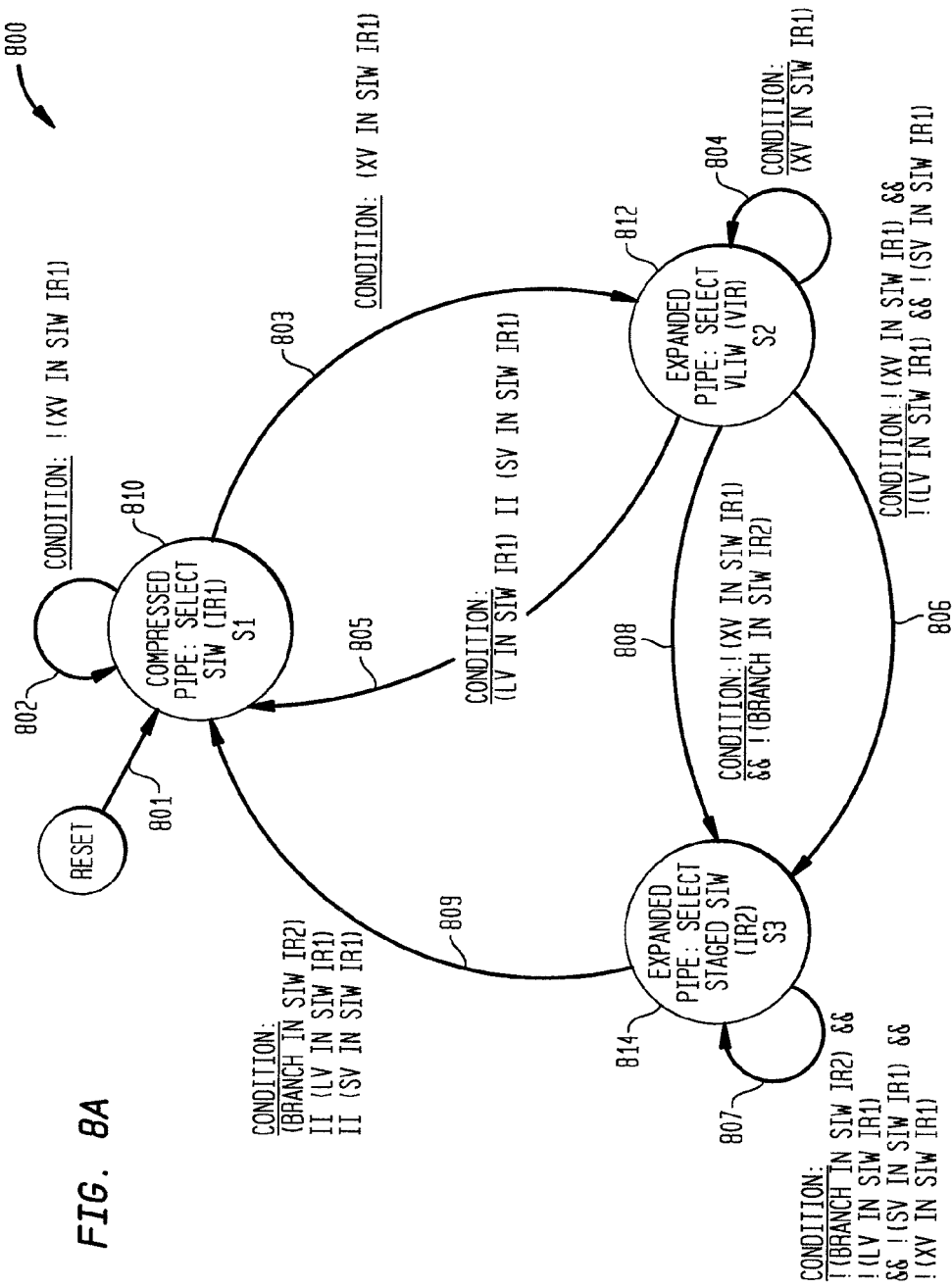
FIG. 8A illustrates a pipeline control state machine suitable for use in conjunction with the present invention.

FIG. 8A illustrates a pipeline control state machine (PCSM) 800 found in the PFC 702, for example, the pipeline state machine 800 includes states S1 810, S2 812, and S3 814. In one aspect, the pipeline state controls the multiplexer 719 via signal 762 and multiplexers 720 via signals 764 to provide a path for a single SIW, not sourced from the VIM 707, to the appropriate decode and execution unit. The pipeline state also controls the multiplexers 720 via signals 764 to provide a path for the SIWs, making up the fetched VLIW, to their appropriate decode and execution units. It is noted that the five multiplexers identified as a group 720 are individually controlled, but for clarity and simplicity of discussion the control lines are shown schematically as a single line 764 that is representative of the multiple control lines.

The PCSM 800 controls the general instruction sequencing and which instruction register, IR1 708, IR2 710 or VIR 712, contents are to be sent to the decode and execution units. The PCSM 800 is designed to expand the pipeline to allow for a VIM 707 access cycle. Once the pipeline is expanded it remains expanded until one of several possible instruction types is decoded in which it is permissible to compress the pipeline, removing the additional pipeline stage that was added for the VIM access. Compressing the pipeline is permissible when a branch type instruction is detected or when a write-access-to-VIM instruction type is detected.

State S1 810 is the normal operating state the processor is in after reset 801 has occurred, and it indicates the pipeline is in a compressed state. In the compressed state, the IR1 708 output 765 is decoded and selected by signal 762 to pass through multiplexer 719 to bus 767 making the IR1 SIW instruction available as one of the inputs to the multiplexers 720. With appropriate decoding and control logic, the appropriate multiplexer, from the multiplexer group 720 that is associated with the desired IR1 SIW decode-and-execute unit, is enabled through use of one of the five multiplexer path-select control lines 764.

State S3 814 corresponds to FIG. 7 multiplexer 719 selecting the IR2 710 output 769 to bus 767 making the IR2 SIW instruction available as one of the inputs to multiplexers 720 and indicates the pipeline is in an expanded state. With appropriate decoding and control logic in the PFC 702, the multiplexer, from the multiplexer group 720 that is associated with the desired IR2 SIW decode-and-execute unit, is enabled through use of one of the five multiplexer path-select control lines 764. State S3 814 is used to keep the pipeline expanded while executing non-VLIW and non-branch SIW instructions that follow the execution of instructions from the VLIW memory 707.

State S2 812 corresponds to FIG. 7 multiplexer group 720 selecting the VIR 712 outputs 770-774 to the decode-and-execute units 722-740 and indicates the pipeline is in an expanded state.

A transition from one state to the next is determined by decoding the IR1 708 and IR2 710 register outputs. The FIG. 8A components of the condition arcs, "LV in SIW IR1", "SV in SIW IR1" as used, for example, in arcs 805 and 809, and "XV in SIW IR1" as used, for example, in arcs 803 and 804 and their logical NOT version components of arcs 802 and 806-808, are respectively decoded from the IR1 register 708. The LV, SV and XV instructions are SIW instructions that have an affect on the type of access made to the VLIW memory. An LV instruction loads the VLIW memory 707 with instructions. An SV instruction, also known as SETV, is used to enable/disable slots for the VLIW by setting or clearing particular bits in the VLIW associated with each slot. An XV instruction fetches a VLIW from the VIM 707 to be decoded in the next cycle and then executed.

In FIG. 8A, the condition (XV in SIW IR1) 803 represents the hardware decoding of the instruction in IR1 to be an XV instruction. This XV in SIW IR1 condition then causes the pipeline to be expanded taking the PCSM to state 812 and a VLIW is fetched from VIM 707. If the next instruction is not another XV or an LV or an SV, logically stated as condition arc 806 !(XV in SIW Ir1) && !(LV in SIW IR1) && !(SV in SIW IR1), where ! indicates a logical NOT and && indicates the logical AND, the PCSM transitions to state 814 to allow an SIW to be selected from IR2 in the expanded pipeline. If the pipeline control is in state 814 and an XV is received in IR1 and there is no branch in IR2, then condition 808 would be met and the pipeline transitions to state 812 where the VLIW for the XV is fetched. It is noted that the pipeline stays in state 812 with the repeated receiving of XVs in IR1 as indicated by the transition arc 804. It is also noted that the pipeline stays in state 814 as long as there is not a branch in IR2, not an LV in IR1, not an SV in IR1 and not an XV in IR1, in other words, when condition 807 is met.

It is noted that in FIG. 8A that the expanded pipeline is compressed when branch type instructions and specific LV or SV instructions are detected. Reconfiguring the pipeline only on these instruction conditions reduces the latency overhead as compared to changing the pipeline between XV and non-XV instructions. In particular, the "Branch in SIW IR2" component of the condition arc 809 of FIG. 8A is decoded by looking at bits in the IR2 710. The branch condition can also be affected by the state of other system components. For example, in a ManArray indirect VIW processor, interrupts force a branch to the interrupt vector table stored in the SIW memory. This type of branch operation can also cause the pipeline to compress so that there is less latency in executing the interrupt service routine. Further details of such pipeline operation can be found in U.S. Pat. No. 6,216,223.

Figure 8B:
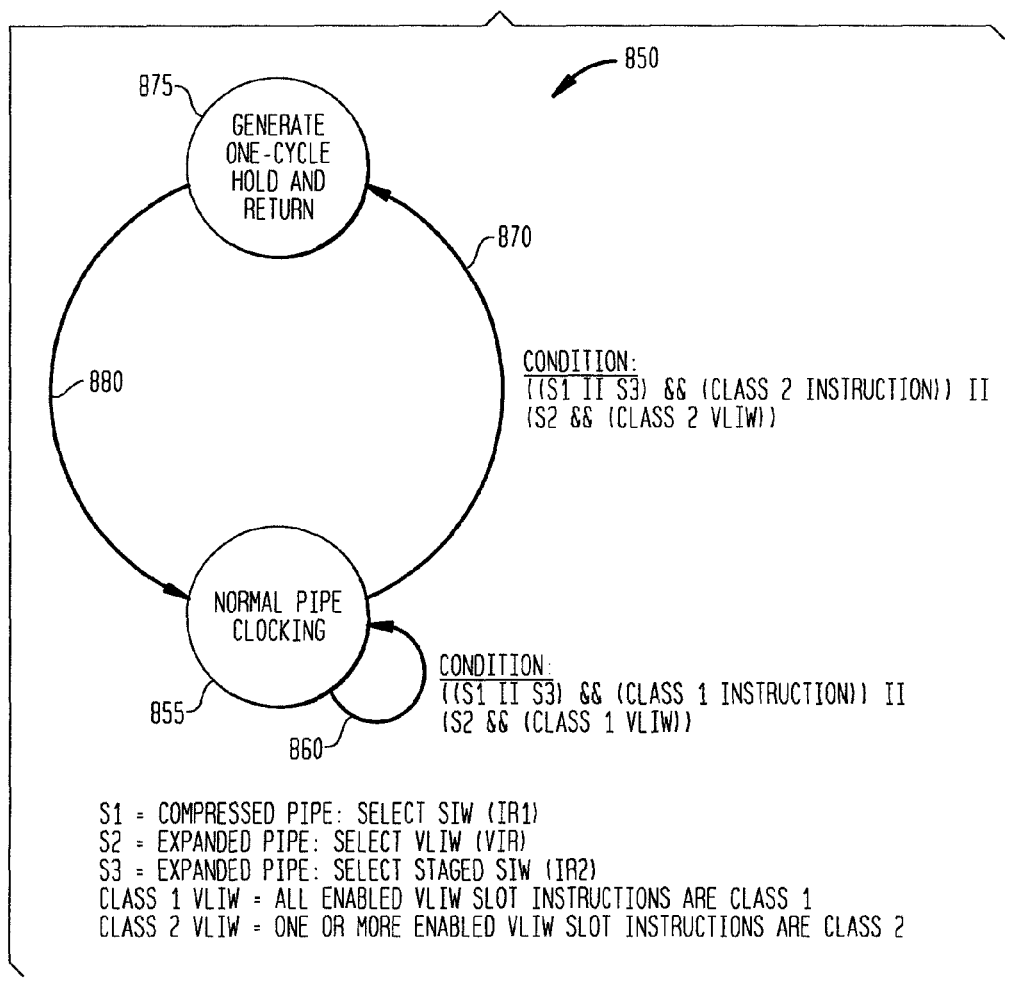
FIG. 8B illustrates a further level of a pipeline control state machine for generating pipeline holds, supporting two classes of instructions and suitable for use in conjunction with the pipeline control state machine of FIG. 8A.

In accordance with the present invention, the PFC 702 receives classified signals 777, one from each decode unit 722, 726, 730, 734 and 738. These classified signals are used in conjunction with the PCSM 800 to generate hold signals using a further level of pipeline control state machine as shown in FIG. 8B. The components of the different condition arcs in pipeline hold state machine (PHSM) 850 are S1 810 indicating the PCSM is in the "Compressed Pipe: Select SIW (IR1)" state, S2 812 indicating the PCSM is in the "Expanded Pipe: Select VLIW (VIR)" state, S3 814 indicating the PCSM is in the "Expanded Pipe: Select Staged SIW (IR2)" state, "Class 1 VLIW" indicating that all the enabled VLIW slot instructions are class 1 and "Class 2 VLIW" indicating that one or more enabled VLIW slot instructions are class 2. The class of an SIW to be processed is also used in state machine condition determination, such as condition arcs 860 and 870. Note that a logical OR is represented as II and a logical AND as &&. The PHSM 850 of FIG. 8B illustrates the "Normal Pipe Clocking" state 855 and the condition being in either state S1 or S3 AND decoding a class 1 instruction OR being in state S2 AND decoding a Class 1 VLIW, mathematically represented as ((S1 II S3) && (Class 1 Instruction)) II (S2 && (Class 1 VLIW)) arc 860, indicating normal pipeline clocking with no hold signal generation required. If condition arc 870 is met where either the PCSM is in S1 OR S3 AND a Class 2 Instruction is decoded OR the PCSM is in S2 AND a Class 2 VLIW is decoded, mathematically represented as ((S1

II S3) && (Class 2 Instruction) II (S2 && (Class 2 VLIW)) arc 870, a one-cycle hold is generated 875 and the pipeline is returned 880 to the "Normal Pipe Clocking" state 855. For VLIW execution, the classified signals 777 are used to detect a Class 1 VLIW or a Class 2 VLIW. A Class 2 VLIW is the case where one or more of the enabled VLIW slot instructions are class 2 and this causes all the enabled VLIW slot instructions to execute at the class 2 rate even if some of the instructions are class 1 instructions.

The hold signals are 779, 781, 783 and 785 to select the IR1 708, IR2 710, VIR 712 and decode registers 723, 727, 731, 735 and 739 feedback paths, respectively, to maintain state in a hold situation. Note that the state maintaining multiplexers 717 may use a hold signal for each multiplexer where the decode register hold signals are represented as a single line 785 in FIG. 7.

It is noted that as an alternative to the use of hold signals and feedback multiplexers to maintain state, gated pipeline stage clocks can be used where the gate control is provided by the instruction class indication determined in the decode stage for each instruction. State is maintained in a pipeline register by not clocking new input values into it thereby maintaining the previously clocked state. The indication that the classification logic produces for a program flow and pipeline controller may contain an encoded form of the number of MCLK cycles required to execute the instruction. For example, consider a processor with three classes of instructions as shown in graph 300 of FIG. 3. For this type of processor, the instruction set architecture (ISA) is divided into three classes of instructions by a field in the instruction encoding or though specific opcode groupings.

For example, consider FIG. 9A which illustrates an example of a basic arithmetic instruction format (ALU, MAU and DSU) 900 where two bits 902 are used in the 6-bit opcode 904 to specify the instruction class 1, 2, 3 and reserved. Using the instruction classification specified in graph 300 of FIG. 3, a 600 Mhz MCLK is chosen which has a period of ~1.67 ns and therefore three MCLK cycles are required for the 5 ns class 1 instructions 310 and encoding 906. Four MCLK cycles are required for the 6.67 ns class 2 instructions 330 and encoding 908. Six MCLK cycles are required for the 10 ns class 3 instructions 320 and encoding 910. Reserved encoding 912 can be assigned to one of the other classes of instructions or can be kept in reserve for a possible fourth class of instruction type.

Note that an instructions data type specification, such as the 3-bit Dtype field 914 of FIG. 9A, may also be used in the instruction classification process. Many multimedia applications primarily make use of byte and half-word data type instructions which would benefit the application program if they were members of a "fast class" of instructions. Other instructions specifying larger data types would become members of a "slower class". This is an important point to consider in the design of the execution units for processors that can vary their pipeline frequency based on instruction type.

FIG. 9B illustrates an adaptable pipeline instruction execution sequence 925, where class 1 instructions are represented by X(1)s, class 2 instructions are represented by X(2)s and class 3 instructions are represented by X(3)s, where the letter X is replaced by a different letter for each specific instruction of the class in parenthesis. Absolute time advances moving down the table with the leftmost column 926 representing cycles at the MCLK rate, a PCLK column 927 representing adaptable period PCLK cycles and the processing stages fetch 928, decode 929, and execute 930 are represented in the final set of columns. The instruction sequence [2], by class, beginning with instruction A(1) is:

A(1), B(2), C(3), D(1), E(1), F(1)       [2]

Figure 10:
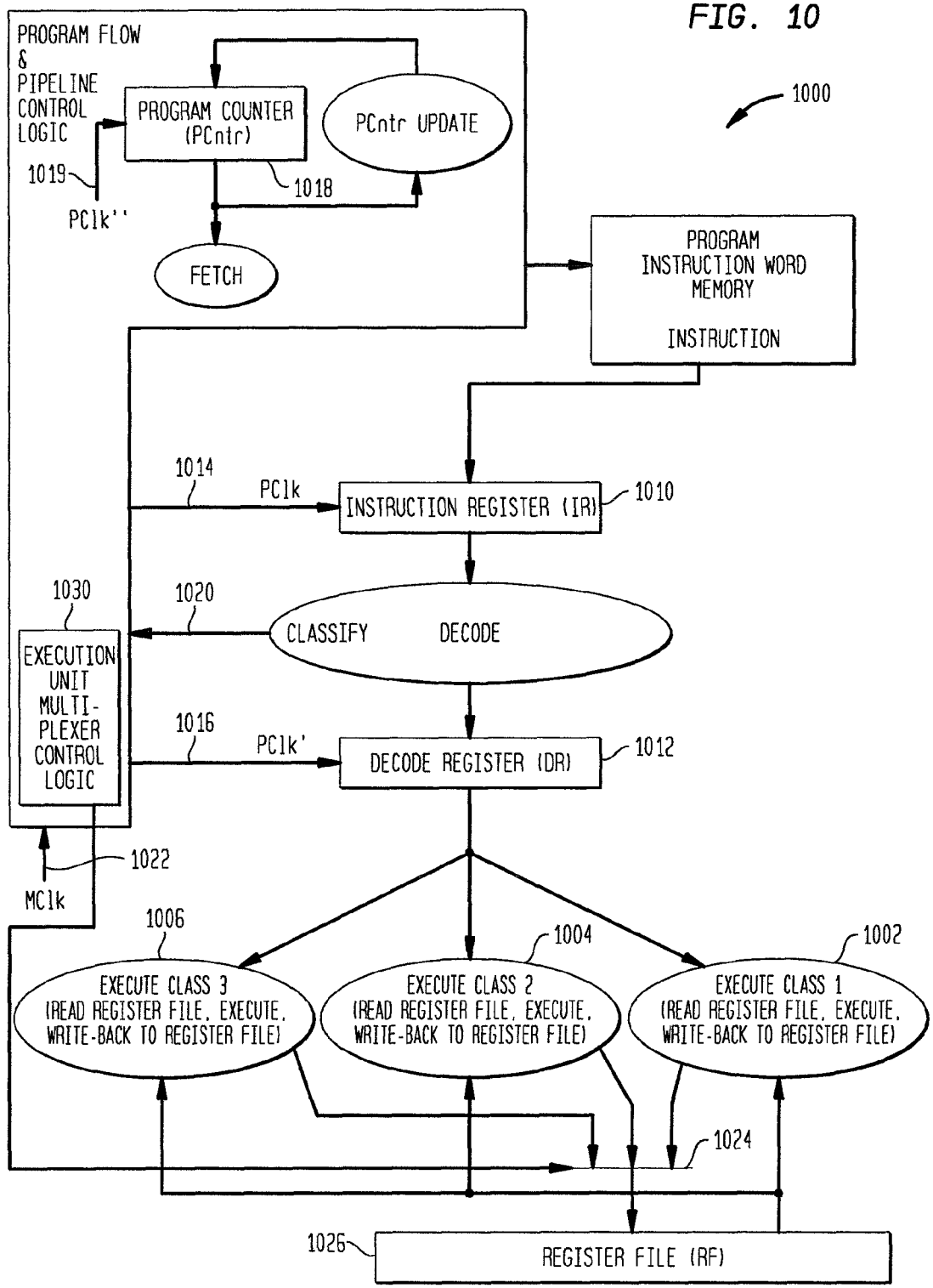
FIG. 10 illustrates a second presently preferred embodiment of a control circuit for supporting three classes of instructions in a three-stage pipeline using a variable clock pipeline controlling mechanism.

FIG. 10 illustrates an adaptable pipeline 1000 with three pipeline stages similar to the pipeline 600 in FIG. 6, but with three execution classes and a new pipeline control mechanism. Specifically, the execution class difference between the adaptable pipeline 1000 of FIG. 10 and pipeline 600 of FIG. 6 manifests itself in the use of three classes of execution units, 1002, 1004 and 1006 in pipeline 1000 compared to the two classes of execution units 652 and 656 in pipeline 600. Another difference between the two pipelines is that the adaptable pipeline 1000 does not use state maintaining feedback paths such as 642 with multiplexer 627 and feedback path 644 with multiplexer 645, nor does the adaptable pipeline 1000 use hold signals such as 630, 638, and 639. Rather than using hold signals, the illustrated instruction register (IR) 1010 and decode register (DR) 1012 use an adaptable clock PCLK 1014 and PCLK' 1016, respectively, and the program counter (PCntr) 1018 uses an adaptable clock PCLK" 1019. Classify signal 1020 provides an indication of the classification of three classes of instructions rather than the two classes supported by pipeline 600 class indication 637. The adaptable clocks, PCLK 1014, PCLK' 1016, and PCLK" 1019 are logic gated versions of the master clock (MCLK) 1022. In addition, the clock gating logic is responsive to the instruction class indication. PCLK 1014, PCLK' 1016, and PCLK" 1019 provide functionally similar timing but variations may exist due to wiring delays, clock buffers, and the like depending on an implementation. In some implementations, PCLK 1014, PCLK' 1016 and PCLK" 1019 may be the same gated clock signal. Another difference concerns multiplexer 1024 which is a three way multiplexer to provide an execution unit result write path to register file 1026 based on the decoded class of the instruction being executed. In pipeline 600 the comparable multiplexer is the two way multiplexer 654 supporting two classes of execution units.

The exemplary instruction sequence [2] in adaptable pipeline sequence 925 of FIG. 9B is discussed in further detail in conjunction with the adaptable pipeline 1000 of FIG. 10. In the pipeline sequence 925, a common PCLK cycle number 927 is used. Instructions enter the pipeline 1000 during the fetch stage as can be seen with the first instruction A(1) 932 being loaded into IR 1010 by the end of the PCLK cycle 1 933. Note that a class 1 instruction uses three MCLK cycles 934-936. During the next PCLK 937, instruction B(2) 938 is being fetched and instruction A(1) 939 is being decoded and classified as a class 1 instruction. Since instruction A(1) is a class 1 instruction, no change to the normal pipeline clocking occurs. At the end of the second PCLK cycle 937, instruction B(2) is loaded into the IR 1010 replacing instruction A(1), the decoded and classified instruction A(1) is loaded into the decode register (DR) 1012, and three more MCLK cycles 940-942 have elapsed. During the next PCLK, PCLK cycle 3 943, instruction C(3) 944 is being fetched, instruction B(2) 945 is being decoded and classified as a class 2 instruction, and instruction A(1) 946 is in execute class 1 unit 1002. Since instruction B(2) is a class 2 instruction, the pipeline controller prepares to extend the next PCLK period to support execution of the class 2 instruction. By the end of the third PCLK cycle 943, instruction C(3) is loaded into the IR 1010 replacing instruction B(2), the decoded and classified instruction B(2) 945 is loaded into the DR 1012, instruction A(1) 946 completes its execution in the execute class 1 unit 1002, and three more MCLK cycles 947-949 have elapsed.

During the next PCLK, PCLK cycle 4 950, instruction D(1) is being fetched and the pipeline advances at a class 2 four MCLK rate such that by the end of the fourth PCLK cycle 950, the instruction D(1) 951 is loaded into the IR 1010 replacing instruction C(3), the pipeline controller was notified of a pending class 3 instruction, the decoded and classified instruction C(3) 952 is loaded into the DR 1012, and the instruction B(2) 953 completes its execution in execute class 2 unit 1004 in four elapsed MCLK cycles 954-957. During the fifth PCLK cycle 958, instruction E(1) is being fetched and the pipeline advances at the class 3 six MCLK rate such that by the end of the fifth PCLK cycle 958, the instruction E(1) 959 is loaded into the IR 1010 replacing instruction D(1), the pipeline controller was notified of a pending class 1 instruction, the decoded and classified instruction D(1) 960 is loaded into the DR 1012, and the instruction C(3) 961 completes its execution in execute class 3 unit 1006 in six elapsed MCLK cycles 962-967. During the sixth PCLK cycle 968, instruction F(1) is being fetched and the pipeline now advances at the class 1 three MCLK rate, such that by the end of the sixth PCLK cycle 968 the instruction F(1) 969 is loaded into the IR 1010 replacing instruction E(1), the pipeline controller was notified of a pending class 1 instruction, the decoded and classified instruction E(1) 970 is loaded into the DR 1012, and the instruction D(1) 971 completes its execution in execute class 1 unit 1002 in three elapsed MCLK cycles 972-974. The pipeline control and operation continues in a similar fashion for each class instruction it receives, decodes and classifies, and executes. Note that based on the decoded class of the instruction being executed, the appropriate path through multiplexer 1024 is selected.

If instructions A(1) through D(1) of sequence [2] were to be executed in a pipeline 100 such as shown in FIG. 1, then the longest latency instruction would set the MCLK period in pipeline 100 and all instructions would execute as a single class. Since the longest latency instruction in sequence [2] is a class 3 instruction, all instructions would execute at the class 3 rate, which, for instruction types as shown in graph 300 of FIG. 3, the class 3 instructions require a 10 ns execution latency. The instruction sequence A(1) through D(1) consists of a fetch stage and decode stage to fill the pipe followed by four execution cycles for a total of 60 ns. In the adaptable pipeline 1000 of FIG. 10, the same sequence would comprise 22 MCLK cycles as illustrated in FIG. 9B which is equal to (22*1.67 ns)=36.74 ns. The speed up of the adaptable pipeline 1000 of FIG. 10 relative to the old pipeline 100 of FIG. 1 is 60/36.74=1.63, for this particular instruction sequence [2].

Figure 12:
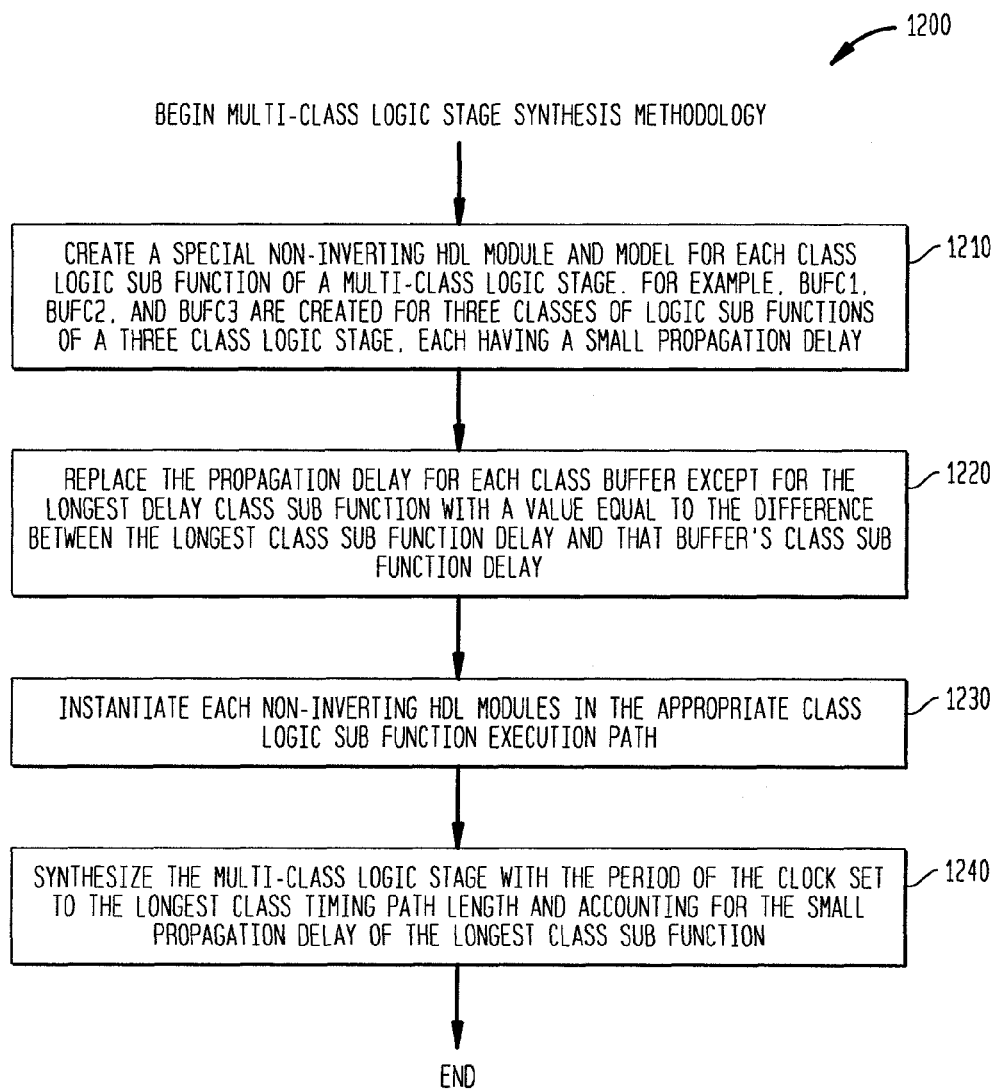
FIG. 12 illustrates a multi-class logic stage synthesis methodology.

At a first glance, a multiple class architecture seems like it would be best built with a full custom design approach. However, the following section describes a basic approach to a single pass synthesis methodology that can be used to obtain timing closure all the way through the back end flow for the execution units of a multiple class instruction set architecture (ISA) such as illustrated in graph 300 of FIG. 3. The synthesis methodology is described more fully with regards to a three class execution stage 1100 of FIG. 11, supporting three classes of instructions, and further illustrated in high level program flow 1200 of FIG. 12. The dynamic class adaptable pipeline synthesis methodology includes a number of basic steps as described below:

(1) Begin by creating special non-inverting buffer hardware description language (HDL) modules, such as can be created in Verilog, and their associated "standard cell" library models for each instruction class the ISA will have, step 1210 of FIG. 12. For example in a three class ISA, three modules would be required.

(2) For simplicity, it is suggested that the associated "standard cell" library models be a copy of the smallest non-inverting buffer available in the HDL library, which is renamed to something that is easily identified to be associated with a particular class. For example, the "standard cell" associated with class 1 instructions will be named BUFC1, the cell associated with class 2 instructions will be named BUFC2, and the cell associated with class 3 instructions will be named BUFC3.

(3) Modify the propagation delay for each renamed standard cell as follows:

BUFC1 requires a propagation delay that is equal to the difference between the delay of the longest class 3 combinational logic path and the delay of the longest class 1 combinational logic path. Typically, the delays used are the worst case delays of the respective logic paths. In the example of graph 300 of FIG. 3, this delay is 10 ns–5 ns=5 ns propagation delay for BUFC1, step 1220.

BUFC2 requires a propagation delay that is equal to the difference between the delay of the longest class 3 combinational logic path and the delay of the longest class 2 combinational logic path. In the example of graph 300 of FIG. 3, this delay is 10 ns-6.67 ns=3.33 ns propagation delay for BUFC2, step 1220.

BUFC3 requires no propagation delay change from that of the buffer that was used to create it, which, if properly chosen, and with a minimum fan-out will have a very small propagation delay, step 1220.

Figure 11:
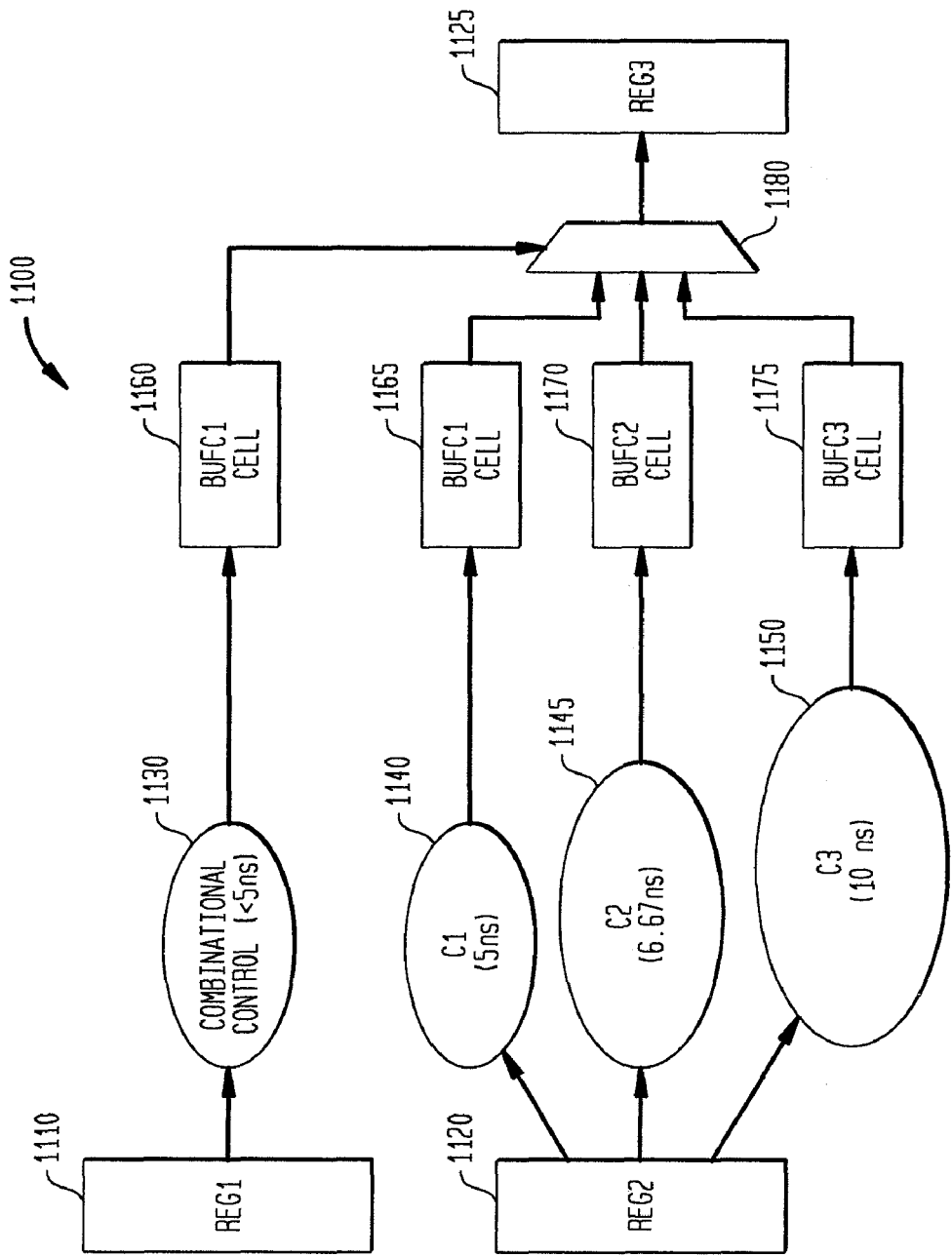
FIG. 11 illustrates an execution stage supporting three classes of instructions to avoid multi-cycle path specification during synthesis.

(4) Instantiate the BUFCx cells at a convenient point within the data paths associated with the instruction class execution units, step 1230, as illustrated in the high level view of a three class execution logic stage 1100 shown in FIG. 11. For reasons of simplicity of illustration, the REG1 1110, REG2 1120, and REG3 1125 blocks represent registers or register files related to all the instruction classes, the C1 1140, C2 1145 and C3 1150 circles represent the execution unit combinational logic for each respective class, and the BUFC1 1165, BUFC2 1170 and BUFC3 1175 blocks represent the "special" instantiated cells. Note that REG2 1120 is comparable to decode register (DR) 1012 of FIG. 10 and operates to provide decoded instruction information. It also is representative of a register file, such as register file 1026, that operates to provide source operands. C1 of FIG. 11 is comparable to execute Class 1 unit 1002, C2 of FIG. 11 is comparable to execute Class 2 unit 1004, and C3 of FIG. 11 is comparable to execute Class 3 unit 1006. Multiplexer 1180 is comparable to multiplexer 1024, REG3 1125 is comparable to register file (RF) 1026, REG1 1110 is comparable to latched bit fields in the decode register (DR) 1012 and combinational control 1130 is comparable to multiplexer 1024 selection logic 1030. The delay of selection logic 1030 is less than 5 ns allowing BUFC1 to be used. Neglecting the propagation delay of the multiplexer 1180, clock-to-output delay of the REG1 1110 and REG2 1120 registers and input setup delay of the REG3 1125 and the original library buffer, the minimum period that the whole circuit could be synthesized to is 10 ns. The propagation delay of the BUFC1 and BUFC2 cells would be set to 5 ns and 3.33 ns, respectively.

(5) Synthesize the entire logic 1100 for all the instruction execution paths with the period of the clock set to the longest latency class period, step 1240. For the example of three execution units, as shown in circuit 1100 of FIG. 11, and an instruction set meeting graph 300 of FIG. 3, the period would be set to 10 ns, though the small propagation delay of BUFC3 may be additionally accounted for.

Figure 13:
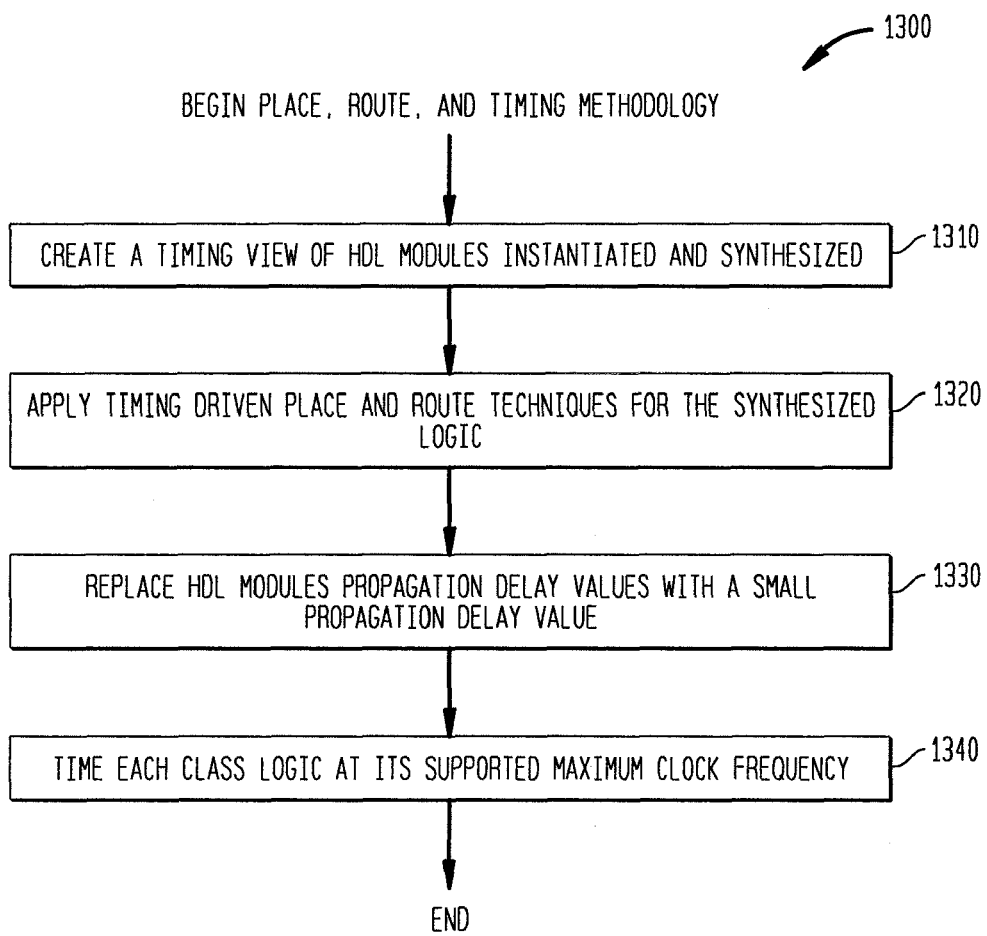
FIG. 13 illustrates a place, route, and timing methodology for the synthesis results of FIG. 12.

The synthesized logic is then placed and routed and the necessary files are generated for static timing, as illustrated in program flow 1300 of FIG. 13. At step 1310, an equivalent timing view for the BUFCx cells are supplied for the place and route tool that is based on the modified synthesis libraries. At step 1320, timing driven place and route techniques and methodologies may be applied seamlessly.

Before extracting timing information for the next step, reread the database with typical buffer timing information used for the 3 new cells. It is suggested that each class instruction path be timed with their respective minimum clock periods. At step 1330 replace the appropriate BUFCx cells with the timing associated with a typical buffer cell, to make sure that no timing paths have been accidentally unaccounted for. At step 1340, static timing can be readily performed at the class 1, 2, and 3 maximum frequencies. Timing at the 10 ns clock period requires no special methodology.

Although this example shows only three classes of instructions, this method is not limited to only three classes and may be extended to any number. This methodology easily scales to as many different instruction classes as are desired. One of its strengths is that it also applies to designs that use resource sharing.

Figure 14:
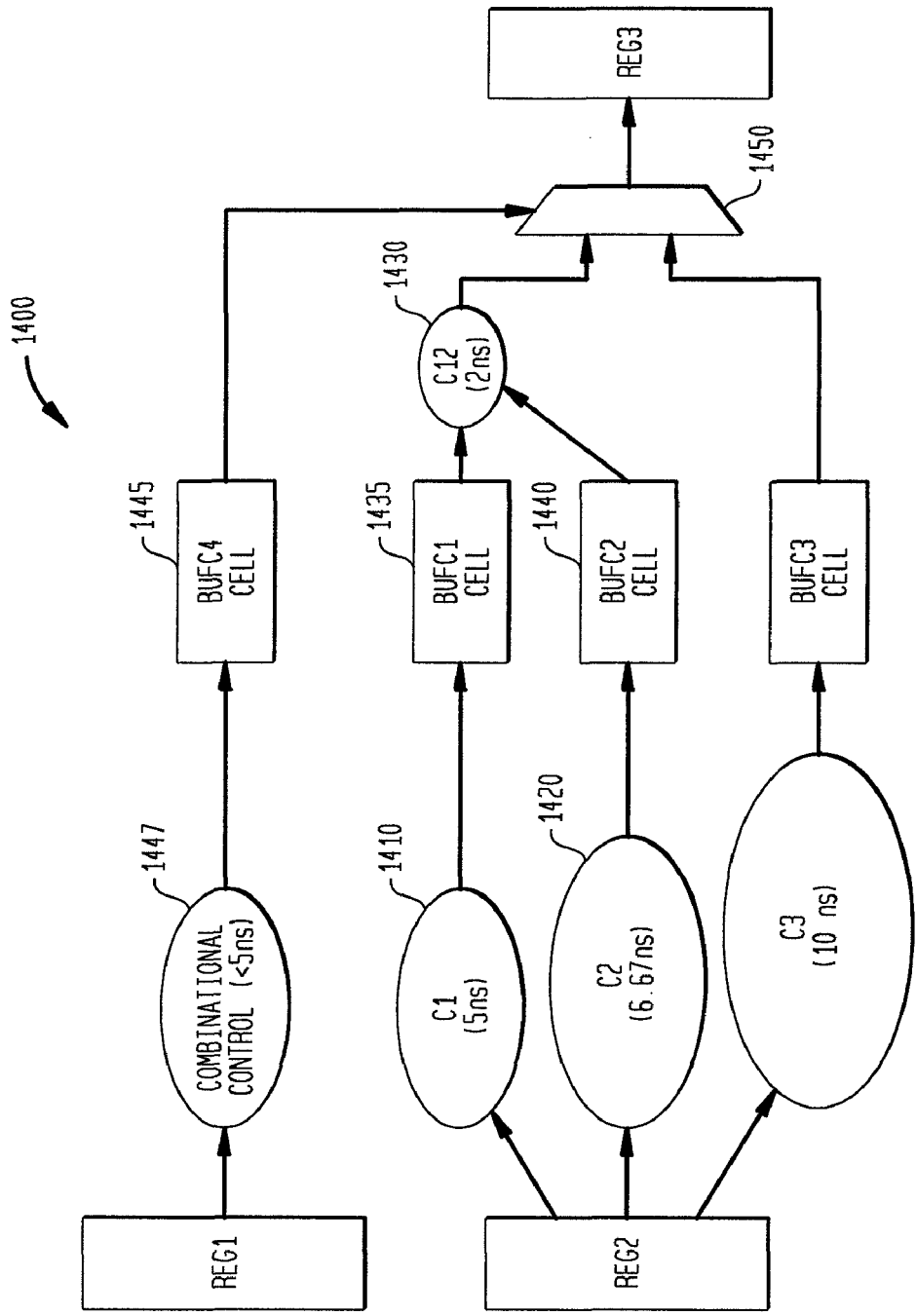
FIG. 14 illustrates an alternative embodiment for the execution stage described in FIG. 11.

As an example a high level three-class execution logic circuit 1400 is shown in FIG. 14. In circuit 1400, class 1 (C1) 1410 and class 2 (C2) 1420 execution unit combinatorial logic blocks both make use of an added combinational block C12 1430. As a result, a number of buffers require new delay values. BUFC1 1435 requires a propagation delay that is equal to the difference between the delay of the longest class 3 combinational logic path and the sum of the delays of the longest C1 and C12 paths. For the example of graph 300 of FIG. 3, this delay is a 10 ns−(5 ns+2 ns)=3 ns propagation delay for BUFC1 1435. BUFC2 1440 requires a propagation delay that is equal to the difference between the delay of the longest class 3 combinational logic path and the sum of the delays of the longest C2 and C12 paths. For the example of graph 300 of FIG. 3, this delay is a 10 ns−(6.67 ns+2 ns)=1.33 ns propagation delay for BUFC2 1440. BUFC4 1445 requires a propagation delay that is calculated in a similar manner to the other buffers, but may also take into account the multiplexer 1450 timing delays to minimize the overall path delay.

The synthesis and timing methodology for the three-class execution logic circuit 1400 is no different than the one used with the three-class execution logic circuit 1100 of FIG. 11. As should be apparent, this methodology becomes much easier and less prone to error than trying to identify multi-cycle paths for use in the synthesis and backend constraint files.

There are a number of aspects to a processor capable of executing at least 2 speed classes of instructions. One of these aspects concerns the instruction fetch (IF) process which, through various techniques known to those skilled in the art, the rate at which instructions can be issued to the decoder can be increased. Note that an increased instruction fetch rate does not limit the general applicability of the present invention. In one example, the possibility exists that up to two fetched instructions might need to be stored in the IF unit at a time. With one or two fetched instructions in the pipe there are plenty of opportunities which arises from this situation to further improve performance, ranging from aggressive branch prediction during a hold cycle to additional pre-processing of the instruction being held in IF.

Another aspect is that the total time needed for branch resolution in the proposed pipeline is potentially smaller than in a traditional fixed pipeline architecture. Even though the number of steps for branch resolution may be the same, there is a high probability that instructions involved in this resolution are members of a class 1, fast group. On the average, this probability means less wait time due to conditional branch resolution. This aspect is particularly important for deeper pipelines.

The inventive approach is particularly applicable to processor architectures, which, in addition to having simpler instructions involving simple data types, for example, adds, compares, and shifts/rotates of small amounts, also support complex instructions with a broad range of data types, from byte to double-word, 64-bit or larger, including packed data extensions. The simpler instructions have shorter critical paths relative to the complex instructions, and could therefore support a higher pipeline frequency, if they were the only instructions executed in the pipeline. Based on an application driven analysis, if the simpler instructions form a useful class, such that they can often be used in a processing context together, then an opportunity for performance improvement exists. For example, by forming a class of instructions which are typically used in sequential code, it is possible to create a subset of simpler instructions that can be executed faster than other, more complex instructions. Then, for a new processor implementation, an existing pipeline can be modified or a new pipeline designed to support this faster operation.

For processor architectures with programmer visible pipelines, adding stages to the execution phase of instruction processing can have the greatest impact on altering the programming model and/or increasing the implementation area, and this invention avoids those problems. For processor architectures where the pipeline is not visible to a programmer, the present invention provides a technique for improved instruction throughput without increasing the pipeline depth and operating clock frequency for all instructions.

New processor designs may use this invention to provide greater flexibility in choosing a pipeline architecture since this approach allows a given pipeline the potential for achieving higher average throughput while minimizing gate count and therefore power consumption. This invention makes shorter pipelines more attractive. A shorter pipeline has advantages in providing a simpler programming model along with simpler implementation, resulting in lower implementation area and power.

For dynamic class adaptable pipeline processors, such as processors using adaptable pipeline 1000 or the like, the mix of instructions can have a great effect on processor performance and power utilization since both performance and power can vary by the program mix of instruction classes. Consequently, application code can be given new degrees of optimization freedom where instruction class and the mix of instructions can be chosen based on performance and power requirements. It is noted that depending upon the frequency of use of instructions in an application program and the performance and power characteristics of the program when executed on the adaptable pipeline processor, a select set of class 1 instructions could be reclassified as class 2 instructions to meet requirements. The reclassification is easily accomplished by changing a class 1 instruction encoding, such as 906 FIG. 9A to a class 2 instruction encoding, such as 908 FIG. 9A. This reclassification would be accounted for in a decode and classification logic function of the processor under development. The reclassification of instruction class can be fixed or programmable. In a programmable approach, all instructions operable at a higher frequency class could be architecturally defined by a change in an instruction's encoding to also be operable at lower frequency classes. Consequently, the class specification of each instruction operable at a higher frequency class could be set in a program to specify operation at a desired class frequency. For example, a class 1 instruction with encoding 906 FIG. 9A could be operable at the class 2 and the class 3 frequencies and a class 2 instruction with encoding 908 FIG. 9A could be operable at the class 3 frequency. A processor architecture then can be defined where an instruction operable at the class 1 frequency would be encoded as a class 1 906, class 2 908, and class 3 910 instruction. The same processor architecture then can be further defined where an instruction operable at the class 2 frequency would be encoded as a class 2 908, and class 3 910 instruction. Instructions operable at the class 3 frequency would only have encodings for class 3 910.

Figure 15:
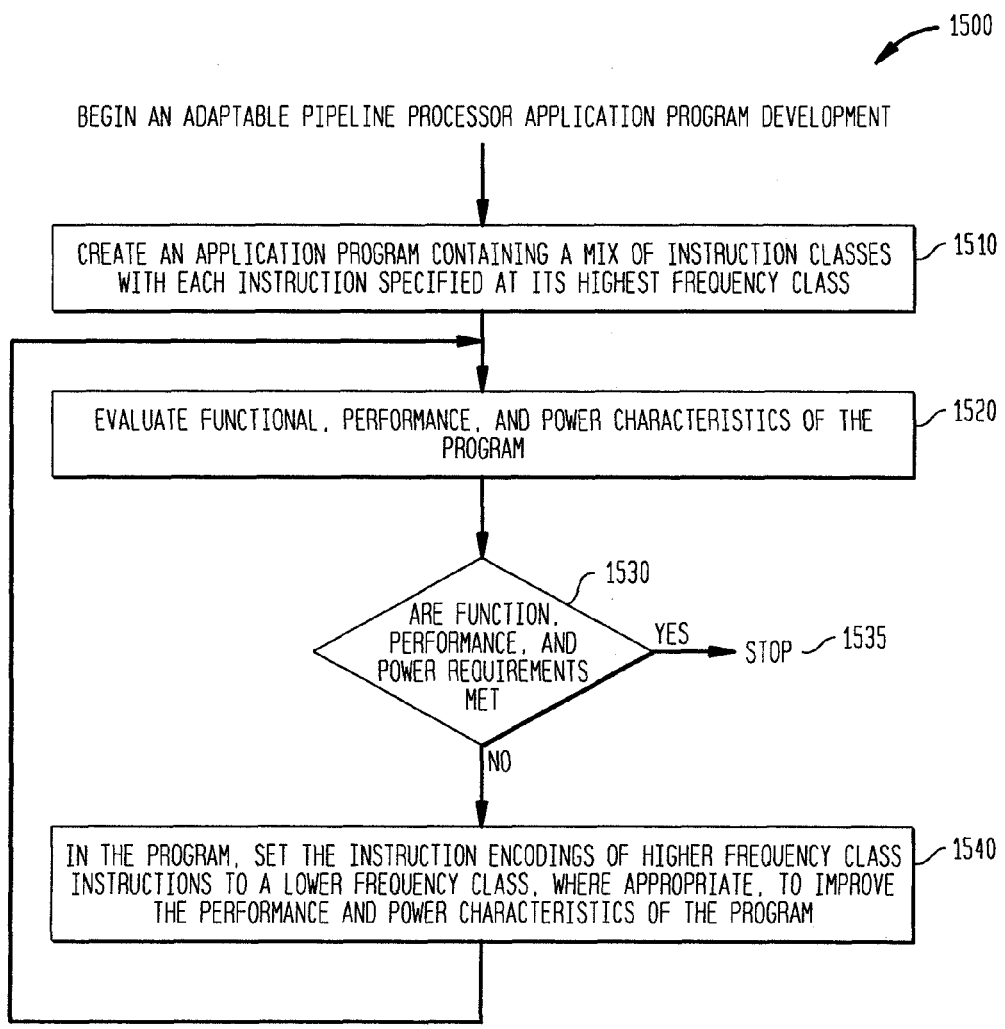
FIG. 15 illustrates an adaptable pipeline processor program optimization flow chart for optimizing performance and power requirements of an application program that uses multi-classes of instructions.

For example, a program that optimizes performance and power can be developed, see adaptable pipeline processor program optimization flow chart 1500 of FIG. 15. In FIG. 15, an instruction class adaptable pipeline processor is programmed to meet the functional requirements of an application program with each instruction specified at its highest frequency of operation class, step 1510. At step 1520, the adaptable pipeline processor would then be evaluated for meeting functional requirements and for performance and power characteristics while executing the program. In decision step 1530, the results of the evaluation are then compared to the function, performance, and power requirements to verify compliance. If the function, performance and power requirements are met then the application program development is stopped at step 1535. Otherwise at step 1540, the application program is modified by changing the instruction class encodings, where appropriate, in the application program to improve the performance and power characteristics of the program. The program process returns to evaluation step 1520 to verify compliance to requirements to continue with change modifications at step 1540, or to stop at step 1535. It is noted that alternative procedures for adaptable pipeline development may be used, for example, a programmer or compiler specification of the instructions encodings can be initially specified, while developing an application program, for performance reasons, or power reasons, or to balance performance and power use.

Further, a programmatic approach with a programmable mode control mechanism could be developed to control an adaptable pipeline to be either in a dynamic mode, as described in the present invention, or in a slow speed mode which can extend the optimization of programs for both performance and power characteristics. The slow speed mode when active changes the operating clock frequency of the adaptable pipeline processor to a frequency lower than the lowest class instruction frequency, for a specifiable majority of the instructions.

While the present invention has been disclosed in a presently preferred context, it will be recognized that the present teachings may be adapted to a variety of contexts consistent with this disclosure and the claims that follow.

We claim:

1. A method for synthesis of an adaptable logic function, the method comprising:
   selecting from an HDL library a first hardware description language (HDL) module (Module1) with a first propagation delay parameter;
   selecting from the HDL library a second HDL module (Module2) with a buffer propagation delay parameter;
   replacing the first propagation delay parameter of Module1 with a second propagation delay parameter set to equalize a difference between worst case timing path delays of a first class instruction execution path and a second class instruction execution path, and wherein said replacing accounts for the buffer propagation delay parameter of Module2;
   instantiating Module1 in the first class instruction execution path to create a first execution path;
   instantiating Module2 in the second class instruction execution path to create a second execution path; and
   synthesizing the adaptable logic function using a computer to generate synthesized logic with a period of a clock of the adaptable logic function set to a worst case timing path delay of the second execution path, wherein worst case timing path delays are determined from a worst case timing path analysis.

2. The method of claim 1 further comprising:
   creating a timing view of Module1 and Module2 for a place and route tool based on the associated second and buffer propagation delay parameters;
   applying timing driven place and route techniques for the synthesized logic;
   replacing the second propagation delay parameter of Module1 with the buffer propagation delay parameter;
   timing the first execution path at a first clock frequency having a first period set to a worst case timing path delay of the first execution path; and
   timing the second execution path at a second clock frequency having a second period set to the worst case timing path delay of the second execution path.

3. The method of claim 1 wherein the first class instruction execution path further comprises:
   a grouping of sub-functions that have a timing path less than or equal to the worst case timing path delay of the first class instruction execution path.

4. The method of claim 1 wherein the second class instruction execution path further comprises:
   a grouping of sub-functions that have a timing path less than or equal to the worst case timing path delay of the second class instruction execution path.

5. The method of claim 1 wherein the first class instruction execution path and the second class instruction execution path are operable to execute an instruction sequence comprising first class instructions mixed with second class instructions.

6. A method for synthesis of an instruction class controllable pipeline stage, the method comprising:
   selecting a first buffer (buffer1) cell for a first logic unit and a second buffer (buffer2) cell for a second logic unit, each with a changeable delay parameter initially set to a buffer propagation delay;
   setting the changeable delay parameter of the buffer1 cell with a first propagation delay equal to the difference between a first worst case timing path duration of the first logic unit and a second worst cast timing path duration of the second logic unit plus the buffer propagation delay of the buffer2 cell;
   instantiating the buffer1 cell in a first execution path having the first worst case timing path duration of the first logic unit to create a first execution path;
   instantiating the buffer2 cell in a second execution path having the second worst case timing path duration of the second logic unit to create a second execution path; and
   synthesizing the instruction class controllable pipeline stage using a computer to generate synthesized logic with a period of a pipeline stage clock set to a worst case timing path duration of the second execution path, wherein worst case timing path durations are determined by a worst case timing path analysis.

7. The method of claim 6 further comprising:
creating a timing view of the buffer1 cell and buffer2 cell for a place and route tool based on the associated first and buffer propagation delays;
applying timing driven place and route techniques for the synthesized logic;
replacing the propagation delay set in the buffer1 cell with the buffer propagation delay;
timing the first execution path at a first frequency; and
timing the second execution path at a second frequency, wherein the second frequency is less than the first frequency.

8. The method of claim 7, further comprising:
decoding a fetched instruction as an instruction of a first class of instructions; and
adapting a latency of operating the instruction class controllable pipeline stage to be equal to the period of the first frequency.

9. The method of claim 7, further comprising:
decoding a fetched instruction as an instruction of a second class of instructions; and
adapting a latency of operating the instruction class controllable pipeline stage to be equal to the period of the second frequency.

10. The method of claim 6 wherein the first logic unit further comprises:
a grouping of sub-functions that have a timing path less than or equal to the first worst case timing path duration.

11. The method of claim 6 wherein the second logic unit further comprises:
a grouping of sub-functions that have a timing path less than or equal to the second worst case timing path duration.

12. A method for single pass synthesis of an instruction class controllable pipeline stage, the method comprising:
selecting a first buffer (buffer1) cell for a first logic unit, a second buffer (buffer2) cell for a second logic unit, and a third buffer (buffer3) cell for a third logic unit, each with a changeable delay parameter initially set to a buffer propagation delay;
setting the changeable delay parameter of the buffer1 cell with a first propagation delay, wherein the first propagation delay is equal to a third worst case timing path duration of the third logic unit plus the buffer propagation delay of the buffer3 cell minus a sum of delays associated with a first worst case timing path duration of the first logic unit and a shared worst case timing path duration of a shared logic unit coupled to the first logic unit;
setting the changeable delay parameter of the buffer2 cell with a second propagation delay, wherein the second propagation delay is equal to the third worst case timing path duration of the third logic unit plus the buffer propagation delay of the buffer3 cell minus a sum of delays associated with a second worst case timing path duration of the second logic unit and the shared worst case timing path duration of the shared logic unit coupled to the second logic unit;
instantiating the buffer1 cell in a first logic path having the first worst case timing path duration of the first logic unit to create a first execution path;
instantiating the buffer1 cell in a second logic path having the second worst case timing path duration of the second logic unit to create a second execution path;
instantiating the buffer3 cell in a third logic path having the third worst case timing path duration of the third logic unit to create a third execution path; and
synthesizing the instruction class controllable pipeline stage using a computer to generate synthesized logic with a period of a pipeline stage clock set to a worst case timing path duration of the third execution path, wherein worst case timing path durations are determined by a worst case timing path analysis.

13. The method of claim 12 further comprising:
creating a first timing view of the buffer1 cell for a place and route tool based on the first propagation delay;
creating a second timing view of the buffer2 cell for a place and route tool based on the second propagation delay;
applying timing driven place and route techniques for the synthesized logic;
replacing the first propagation delay in the buffer1 cell with the buffer propagation delay;
replacing the second propagation delay in the buffer2 cell with the buffer propagation delay;
timing the first execution path at a first frequency;
timing the second execution path at a second frequency, wherein the second frequency is less than the first frequency; and
timing the third execution path at a third frequency, wherein the third frequency is less than the second frequency.

14. The method of claim 13, further comprising:
decoding a fetched instruction as a first class instruction; and
adapting a latency of operating the instruction class controllable pipeline stage to be equal to a period of the first frequency.

15. The method of claim 13, further comprising:
decoding a fetched instruction as a second class instruction; and
adapting a latency of operating the instruction class controllable pipeline stage to be equal to a period of the second frequency.

16. The method of claim 13, further comprising:
decoding a fetched instruction as a third class instruction; and
adapting a latency of operating the instruction class controllable pipeline stage to be equal to a period of the third.

17. The method of claim 13, wherein the first logic unit further comprises:
a grouping of instruction specified sub-functions that are operable at the first frequency.

18. The method of claim 13, wherein the second logic unit further comprises:
a grouping of instruction specified sub-functions that are operable at the second frequency.

19. The method of claim 12, wherein the instruction class controllable pipeline stage is an instruction execution stage of a processor pipeline that supports three classes of instructions each operable with a different pipeline stage latency.

20. The method of claim 12, wherein the third logic unit further comprises:
a grouping of instruction specified sub-functions that are operable at the third frequency.

* * * * *